(12) United States Patent
Perkins et al.

(10) Patent No.: US 8,814,961 B2
(45) Date of Patent: Aug. 26, 2014

(54) VARIOUS METHODS AND APPARATUSES FOR A RADIANT-HEAT DRIVEN CHEMICAL REACTOR

(75) Inventors: Christopher Perkins, Boulder, CO (US); Zoran Jovanovic, Louisville, CO (US); Timothy E. Laska, Loveland, OH (US)

(73) Assignee: Sundrop Fuels, Inc., Longmont, CO (US)

( * ) Notice: Subject to any disclaimer, the term of this patent is extended or adjusted under 35 U.S.C. 154(b) by 0 days.

(21) Appl. No.: 13/429,749

(22) Filed: Mar. 26, 2012

(65) Prior Publication Data
US 2012/0241677 A1 Sep. 27, 2012

Related U.S. Application Data

(63) Continuation-in-part of application No. 13/254,020, filed as application No. PCT/US2010/059564 on Dec. 8, 2010, which is a continuation of application No. 12/795,947, filed on Jun. 8, 2010, said application No. 13/254,020 is a continuation-in-part of application No. 12/795,947, application No. 13/429,749, which is a continuation-in-part of application No. 12/795,947.

(60) Provisional application No. 61/380,116, filed on Sep. 3, 2010, provisional application No. 61/248,282, filed on Oct. 2, 2009, provisional application No. 61/185,492, filed on Jun. 9, 2009.

(51) Int. Cl.
*B01J 7/00* (2006.01)

(52) U.S. Cl.
USPC ............................................................. 48/61

(58) Field of Classification Search
CPC ...................... B01J 19/127; B01J 2208/00451; F24J 2/07; F24J 2/42; Y02E 10/41
See application file for complete search history.

(56) References Cited

U.S. PATENT DOCUMENTS

| 1,508,464 A | 9/1924 | McFarland |
| 2,237,491 A | 4/1941 | Kutz |

(Continued)

FOREIGN PATENT DOCUMENTS

| JP | 2002/012877 A | 1/2002 |
| SU | 1763814 A1 | 9/1992 |

(Continued)

OTHER PUBLICATIONS

U.S. Appl. No. 61/119,062, filed Dec. 2, 2008, Stites.

(Continued)

*Primary Examiner* — Imran Akram
(74) *Attorney, Agent, or Firm* — Rutan & Tucker, LLP

(57) ABSTRACT

Heat-transfer-aid particles entrained with 1) biomass particles, 2) reactant gas, or 3) both are fed into the radiant heat chemical reactor. The inner wall of a cavity and the tubes of the chemical reactor act as radiation distributors by either absorbing radiation and re-radiating it to the heat-transfer-aid particles or reflecting the incident radiation to the heat-transfer-aid particles. The radiation is absorbed by the heat-transfer-aid particles, and the heat is then transferred by conduction to the reacting gas at temperatures between 900° C. and 1600° C. The heat-transfer-aid particles mix with the reactant gas in the radiant heat chemical reactor to sustain the reaction temperature and heat transfer rate to stay within a pyrolysis regime. The heat-transfer-aid particles produce a sufficient heat surface-area to mass ratio of these particles when dispersed with the reactant gas to stay within the pyrolysis regime during the chemical reaction.

10 Claims, 15 Drawing Sheets

(56) References Cited

U.S. PATENT DOCUMENTS

| | | |
|---|---|---|
| 4,164,123 A | 8/1979 | Smith |
| 4,219,492 A | 8/1980 | Konoki et al. |
| 4,247,755 A | 1/1981 | Smith, Jr. et al. |
| 4,415,339 A | 11/1983 | Aiman et al. |
| 4,455,153 A | 6/1984 | Jakahi |
| 4,552,741 A | 11/1985 | Melchior |
| 4,704,137 A | 11/1987 | Richter |
| 4,756,722 A | 7/1988 | Knop et al. |
| 4,766,154 A | 8/1988 | Bonnell et al. |
| 5,179,129 A | 1/1993 | Studer |
| 5,196,460 A | 3/1993 | Lora et al. |
| 5,581,998 A | 12/1996 | Craig |
| 5,618,500 A | 4/1997 | Wang |
| 5,647,877 A | 7/1997 | Epstein |
| 5,747,320 A | 5/1998 | Saha et al. |
| 5,882,905 A | 3/1999 | Saha et al. |
| 5,906,799 A | 5/1999 | Burgie et al. |
| 6,172,204 B1 | 1/2001 | Sarkanen et al. |
| 6,402,988 B1 | 6/2002 | Gottzmann et al. |
| 6,555,350 B2 | 4/2003 | Ahring et al. |
| 6,660,244 B2 | 12/2003 | Negishi et al. |
| 6,660,506 B2 | 12/2003 | Nguyen et al. |
| 6,676,716 B2 | 1/2004 | Fujimura et al. |
| 6,872,378 B2 | 3/2005 | Weimer et al. |
| 6,899,791 B2 | 5/2005 | Sabourin |
| 7,033,570 B2 | 4/2006 | Weimer et al. |
| 7,109,005 B2 | 9/2006 | Eroma et al. |
| 7,207,327 B2 | 4/2007 | Litwin et al. |
| 7,300,540 B2 | 11/2007 | Sabourin et al. |
| 7,553,476 B2 | 6/2009 | Marrella et al. |
| 7,625,728 B2 | 12/2009 | Eroma et al. |
| 7,632,476 B2 | 12/2009 | Shah et al. |
| 7,686,856 B2 | 3/2010 | Hemmings et al. |
| 7,713,381 B2 | 5/2010 | Sabourin et al. |
| 7,846,294 B2 | 12/2010 | Sabourin et al. |
| 7,856,829 B2 | 12/2010 | Shah et al. |
| 7,871,457 B2 | 1/2011 | Shah et al. |
| 7,881,825 B2 | 2/2011 | Esposito et al. |
| 7,919,070 B2 | 4/2011 | Stites et al. |
| 7,931,888 B2 | 4/2011 | Drnevich et al. |
| 7,985,399 B2 | 7/2011 | Drnevich et al. |
| 8,003,352 B2 | 8/2011 | Foody et al. |
| 8,007,761 B2 | 8/2011 | Drnevich et al. |
| 8,028,945 B2 | 10/2011 | Gingras |
| 8,057,639 B2 | 11/2011 | Pschorn et al. |
| 8,157,195 B2 | 4/2012 | Gingras |
| 8,187,849 B2 | 5/2012 | Larsen |
| 8,192,854 B2 | 6/2012 | Borole |
| 8,378,151 B2 | 2/2013 | Perkins |
| 2002/0134019 A1 | 9/2002 | Paisley |
| 2003/0182861 A1 | 10/2003 | Weimer et al. |
| 2003/0208959 A1 | 11/2003 | Weimer et al. |
| 2003/0213514 A1 | 11/2003 | Ortabasi |
| 2004/0170210 A1 | 9/2004 | Do et al. |
| 2004/0219079 A1 | 11/2004 | Hagen et al. |
| 2005/0020700 A1 | 1/2005 | Bahnisch |
| 2005/0142049 A1 | 6/2005 | Amsden et al. |
| 2006/0024538 A1 | 2/2006 | Steinberg |
| 2006/0096298 A1 | 5/2006 | Barnicki et al. |
| 2006/0140848 A1 | 6/2006 | Weimer et al. |
| 2006/0188433 A1 | 8/2006 | Weimer et al. |
| 2006/0225424 A1 | 10/2006 | Elliott et al. |
| 2007/0098602 A1 | 5/2007 | Haueter et al. |
| 2007/0129450 A1 | 6/2007 | Barnicki et al. |
| 2007/0225382 A1 | 9/2007 | Van Den Berg et al. |
| 2008/0025884 A1 | 1/2008 | Tonkovich et al. |
| 2008/0039674 A1* | 2/2008 | Mason ............ 588/321 |
| 2008/0057366 A1 | 3/2008 | Katikaneni et al. |
| 2008/0086946 A1 | 4/2008 | Weimer et al. |
| 2008/0104003 A1 | 5/2008 | Macharia et al. |
| 2008/0209891 A1 | 9/2008 | Johannes et al. |
| 2008/0222955 A1 | 9/2008 | Jancker et al. |
| 2008/0223214 A1 | 9/2008 | Palamara et al. |
| 2008/0284401 A1 | 11/2008 | Oettinger et al. |
| 2008/0293132 A1 | 11/2008 | Goldman et al. |
| 2008/0302670 A1 | 12/2008 | Boyle |
| 2008/0307703 A1 | 12/2008 | Dietenberger |
| 2009/0013601 A1 | 1/2009 | Mandich et al. |
| 2009/0014689 A1 | 1/2009 | Klepper et al. |
| 2009/0018221 A1 | 1/2009 | Klepper et al. |
| 2009/0018222 A1 | 1/2009 | Klepper et al. |
| 2009/0018371 A1 | 1/2009 | Klepper et al. |
| 2009/0018372 A1 | 1/2009 | Tirmizi et al. |
| 2009/0064578 A1 | 3/2009 | Theegala |
| 2009/0069452 A1 | 3/2009 | Robota |
| 2009/0069609 A1 | 3/2009 | Kharas et al. |
| 2009/0093555 A1 | 4/2009 | Stites et al. |
| 2009/0151251 A1 | 6/2009 | Manzer et al. |
| 2009/0151253 A1 | 6/2009 | Manzer et al. |
| 2009/0156392 A1 | 6/2009 | Kharas et al. |
| 2009/0156393 A1 | 6/2009 | Kharas et al. |
| 2009/0156697 A1 | 6/2009 | Kharas et al. |
| 2009/0313886 A1 | 12/2009 | Hinman |
| 2009/0318573 A1 | 12/2009 | Stites et al. |
| 2010/0000874 A1 | 1/2010 | Hinman |
| 2010/0022806 A1 | 1/2010 | Meitzner |
| 2010/0075837 A1 | 3/2010 | Meitzner et al. |
| 2010/0076228 A1 | 3/2010 | Alsum et al. |
| 2010/0099925 A1 | 4/2010 | Kharas |
| 2010/0099926 A1 | 4/2010 | Kharas |
| 2010/0099927 A1 | 4/2010 | Kharas |
| 2010/0137459 A1 | 6/2010 | Stites et al. |
| 2010/0152497 A1 | 6/2010 | Stites |
| 2010/0152498 A1 | 6/2010 | Kharas et al. |
| 2010/0210741 A1 | 8/2010 | Kharas |
| 2010/0212220 A1 | 8/2010 | Tirmizi |
| 2010/0237291 A1 | 9/2010 | Simmons |
| 2010/0242352 A1 | 9/2010 | Perkins |
| 2010/0242353 A1 | 9/2010 | Jovanovic |
| 2010/0242354 A1 | 9/2010 | Perkins |
| 2010/0243961 A1 | 9/2010 | Hilton |
| 2010/0247387 A1 | 9/2010 | Perkins |
| 2010/0249251 A1 | 9/2010 | Hilton |
| 2010/0249468 A1 | 9/2010 | Perkins |
| 2010/0270505 A1 | 10/2010 | Gallaspy et al. |
| 2010/0273899 A1 | 10/2010 | Winter |
| 2010/0280287 A1 | 11/2010 | Kharas et al. |
| 2010/0303692 A1 | 12/2010 | Perkins |
| 2010/0331581 A1 | 12/2010 | Kharas et al. |
| 2011/0107661 A1 | 5/2011 | Tirmizi et al. |
| 2011/0107662 A1 | 5/2011 | Tirmizi et al. |
| 2011/0107663 A1 | 5/2011 | Tirmizi et al. |
| 2011/0124927 A1 | 5/2011 | Stites et al. |
| 2011/0150722 A1 | 6/2011 | Stites et al. |
| 2011/0155958 A1 | 6/2011 | Winter et al. |
| 2011/0301732 A1 | 12/2011 | Gao et al. |
| 2012/0181483 A1 | 7/2012 | Perkins et al. |
| 2012/0241677 A1 | 9/2012 | Perkins et al. |

FOREIGN PATENT DOCUMENTS

| | | |
|---|---|---|
| WO | WO 2010/144537 A9 | 12/2010 |
| WO | WO 2010/144540 A1 | 12/2010 |
| WO | WO 2010/144542 A1 | 12/2010 |
| WO | WO 2010/144544 A1 | 12/2010 |
| WO | WO 2010/144547 A1 | 12/2010 |
| WO | WO 2010/144549 A1 | 12/2010 |
| WO | WO 2010/144552 A1 | 12/2010 |
| WO | WO 2010/144554 A1 | 12/2010 |
| WO | WO 2010/144556 A1 | 12/2010 |

OTHER PUBLICATIONS

Higuchi, Takayoshi "Steam Explosion of Wood", Sections 1-4, Biomass Handbook, © 1989 by OPA (Amsterdam), pp. 470-473 plus Cover, Biblio, Table of Contents excerpt. 7 pages total, Editors: Osamu Kitani & Carl W. Hall, ISBN 2-88124-269-3, Gordon and Breach Science Publishers S. A., Cooper Station, New York, New York.

"StakeTech—First Pulping System Receives Full Acceptance", May 14, 1996, 2 pages. Publisher: Business Wire. downloaded from http://www.thefreelibrary.com/StakeTech.

(56) References Cited

OTHER PUBLICATIONS

McCallum, Don, "Medium Density Fiber Board" pp. 8-11, Nov. 1, 1996 http://fennerschool-associated.anu.edu.au/fpt/mdf/manufacture.html.

Requirement for Restriction/Election for the U.S. Appl. No. 13/531,318 mailed May 20, 2013, 7 pages. U.S. Patent & Trademark Office, Alexandria, Virginia USA.

Munzinger, M., et al., "Biomass Gassification Using Solar Thermal Energy", *Anzses 2006*, pp. 1-10.

Mishra, Anuradha, et al., "Thermal Optimization of Solar Biomass Hybrid Cogeneration Plants", *Journal of Scientific & Industrial Research*, vol. 65, Apr. 2006, pp. 355-363.

Esser, Peter, et al., "The Photochemical Synthesis of Fine Chemicals With Sunlight," Angew. Chem. Int. Ed. Engl. 1994, vol. 33, pp. 2009-2023.

Cross Reference to Related Applications Under 27 C.F.R. 1.78, 2 pages.

Restriction Requirement for U.S. Appl. No. 12/795,910 mailed Feb. 20, 2013, 6 pages. U.S. Patent and Trademark Office, Alexandria, Virginia USA.

*Netscape Communications Corp. v. ValueClick, Inc.*, 684 F. Supp. 2d. 678—Dist. Court, ED Virginia 2010. No. 1:09cv225. United States District Court, E. D. Virginia, Alexandria Division. Oct. 22, 2009. 38 pages.

*Ex Parte Wada and Murphy*, U.S. Patent and Trademark Office Board of Patent Appeals and Interferences Decision on Appeal dated Jan. 14, 2008, 9 pages.

*Ex Parte Chapman*, U.S. Patent and Trademark Office Board of Patent Appeals and Interferences Decision on Appeal dated Feb. 9, 2012 for Appeal No. 2009-010238, U.S. Appl. No. 10/751,616, 6 pages.

Decision on Petition for the U.S. Appl. No. 12/795,910 mailed Jun. 22, 2010, 2 pages. U.S. Patent & Trademark Office, Alexandria, Virginia USA.

Bridgwater, et al., "Fast Pyrolysis Processes for Biomass," Renewable and Sustainable Energy Reviews, vol. 4, No. 1, 73 pages, Mar. 2000.

Lede, "Solar Thermochemical Conversion of Biomass", Solar Energy, vol. 65, No. 1, 11 pages, Jan. 1, 1999.

Restriction Requirement for U.S. Appl. No. 13/429,749 mailed May 24, 2013, 5 pages. U.S. Patent and Trademark Office, Alexandria, Virginia USA.

\* cited by examiner

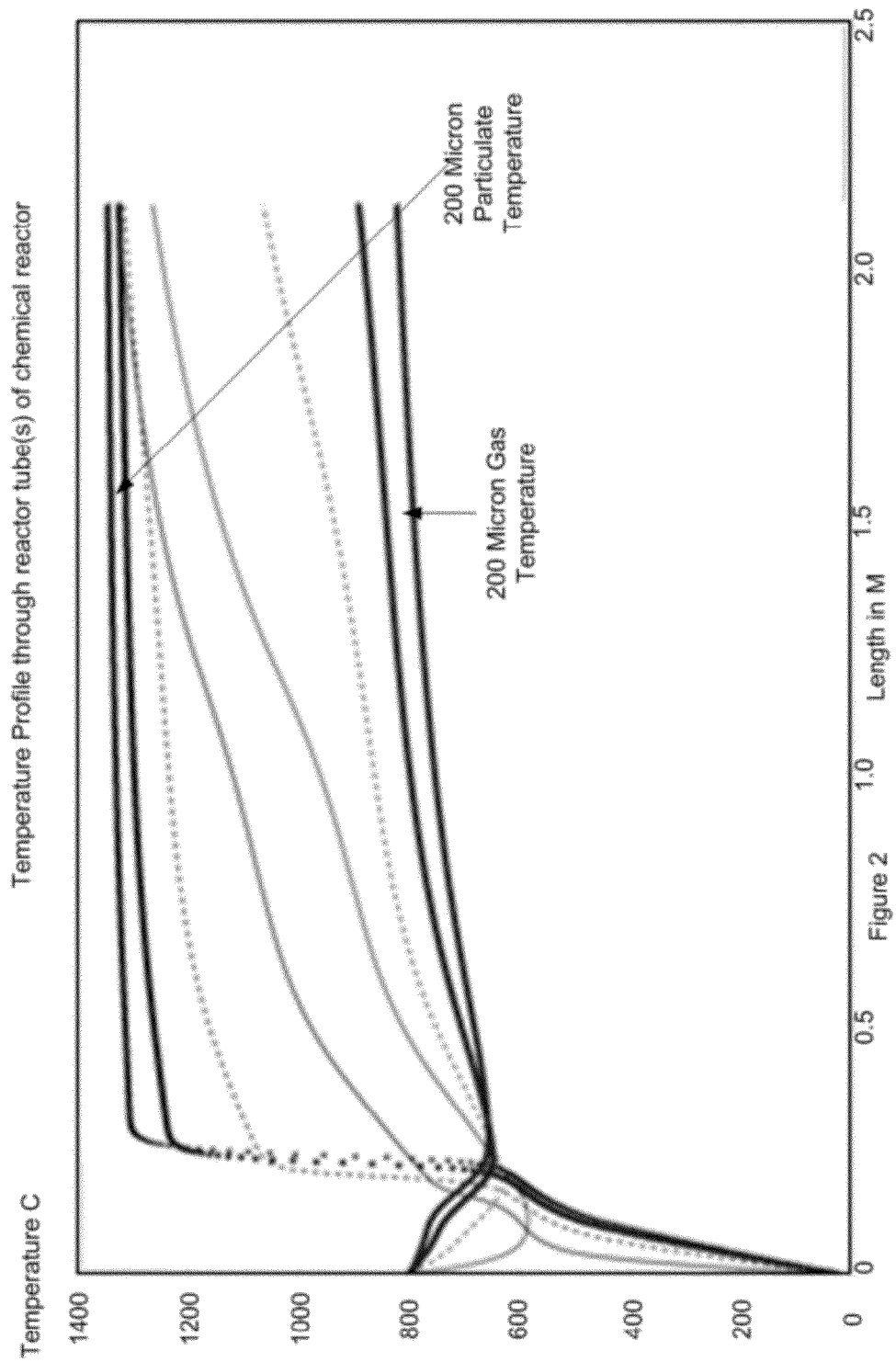

Convective transport:

Heat transfer between particulates and gas $$\dot{Q} = hA\Delta T$$

$$Nu = 2 = \frac{hD}{k_g}$$

$$A = N_p A_p = \left(\frac{6\dot{m}\tau}{\rho_p \pi D^3}\right)(\pi D^2)$$

$$\Delta T = \left(\frac{\dot{Q}\rho_p}{12 k_g \dot{m}\tau}\right) D^2$$

- Heat to mass ratio fixed (depending on lignin/char content) by biomass
- Particle diameter much more important than residence time

Figure 3

Radiation heat transfer to participating media $$\frac{di_\lambda}{dS} = -(a_\lambda + \sigma_\lambda)i_\lambda + a_\lambda i_{\lambda b} + \frac{1}{4\pi}\int_0^{4\pi} i_\lambda \sigma_\lambda \Phi(\theta,\phi)d\omega$$

- Absorption and scattering
- Emission
- In-scattering $$-\nabla \cdot \vec{q}_r = \int_0^\infty K_\lambda \left[\int_0^{4\pi} i_\lambda \delta\omega\delta\lambda - 4\Pi \, {}^{4\Pi}\!\int_0^\infty K_\lambda i_{\lambda b}\delta\lambda\right]$$

Figure 4b

VARIOUS METHODS AND APPARATUSES FOR A RADIANT-HEAT DRIVEN CHEMICAL REACTOR

RELATED APPLICATIONS

This application is continuation in part of and claims priority to U.S. application Ser. No. 13/254020 titled VARIOUS METHODS AND APPARATUSES FOR AN RADIANT HEAT DRIVEN CHEMICAL REACTOR, which is a U.S. national stage application under 35 USC §371 of International Application No. PCT/US2010/059564, titled VARIOUS METHODS AND APPARATUSES FOR AN RADIANT HEAT DRIVEN CHEMICAL REACTOR filed Dec. 8, 2010, which claims the benefit of both U.S. patent application Ser. No. 12/795,947, filed Jun. 8, 2010 and entitled "SYSTEMS AND METHODS FOR AN INDIRECT RADIATION DRIVEN GASIFIER REACTOR & RECEIVER CONFIGURATION and 2) U.S. Provisional Patent Application Ser. No. 61/380,116, filed Sep. 3, 2010 and entitled "HIGH HEAT FLUX CHEMICAL REACTOR, and U.S. application Ser. No. 13/254,020 titled VARIOUS METHODS AND APPARATUSES FOR AN RADIANT HEAT DRIVEN CHEMICAL REACTOR is also a continuation-in-part of and claims priority to U.S. patent application Ser. No. 12/795,947, filed Jun. 8, 2010 and entitled "SYSTEMS AND METHODS FOR AN INDIRECT RADIATION DRIVEN GASIFIER REACTOR & RECEIVER CONFIGURATION," which claims the benefit of both U.S. Provisional Patent Application Ser. No. 61/248,282, filed Oct. 2, 2009 and entitled "Various Methods and Apparatuses for Sun Driven Processes," and U.S. Provisional Patent Application Ser. No. 61/185,492, titled "VARIOUS METHODS AND APPARATUSES FOR SOLAR-THERMAL GASIFICATION OF BIOMASS TO PRODUCE SYNTHESIS GAS" filed Jun. 9, 2009. This application is also a continuation-in-part of and claims priority to U.S. patent application Ser. No. 12/795,947, filed Jun. 8, 2010 and entitled "SYSTEMS AND METHODS FOR AN INDIRECT RADIATION DRIVEN GASIFIER REACTOR & RECEIVER CONFIGURATION," which claims the benefit of both U.S. Provisional Patent Application Ser. No. 61/248,282, filed Oct. 2, 2009 and entitled "Various Methods and Apparatuses for Sun Driven Processes," and U.S. Provisional Patent Application Ser. No. 61/185,492, titled "VARIOUS METHODS AND APPARATUSES FOR SOLAR-THERMAL GASIFICATION OF BIOMASS TO PRODUCE SYNTHESIS GAS" filed Jun. 9, 2009.

BACKGROUND

A radiant heat driven chemical reactor can be used to drive a number a processes including a process to generate syngas. Some prior art describes a detailed model for radiation to particulates and then convective heat transport from the particulates to the gas in a single tube solar-driven reactor. This system uses very small particles, where the continuum assumption is no longer valid and molecular transport must be considered. Some other prior art describes a directly radiated fluidized bed of ZrO2 and SiC particles that heats an inert gas rather than entrained particles in a reactant gas and absorb radiation and aid in transferring energy to the reactant gas. Other sources teach about radiation heat transfer in combustion systems but teach that in combustion systems, radiation is a common method of heat loss for the gas, which transfers energy to particulate products by convection that subsequently radiate the energy away. This is generally the opposite of using a particle as a heat aid to transfer heat to the gas phase to cause and sustain the reaction.

SUMMARY

A radiant heat driven chemical reactor can be used to drive a number a processes including a process to generate syngas. In an embodiment, a method is used to generate a product gas from a radiant heat driven chemical reactor. The chemical reaction is driven primarily by radiant heat occurring within the radiant heat chemical reactor. The chemical reaction is an endothermic reaction including one or more of biomass gasification ($CnHm+H2O \rightarrow CO+H2+H2O+X$), steam methane reforming ($CH4+H2O \rightarrow CO+3H2$), and steam methane cracking to produce ethane ($H2O+CH3+CH3 \rightarrow C2H6+H2O$); steam methane cracking to produce ethylene ($CH4+H2O \rightarrow C2H4$), and other similar chemical reactions. Heat-transfer-aid particles entrained with 1) biomass particles, 2) reactant gas, or 3) both are fed into the radiant heat chemical reactor. The indirect radiation driven geometry of the radiant heat chemical reactor uses radiation as a primary mode of heat transfer the heat-transfer-aid particles, the reactant gas, and any biomass particles entrained with the heat-transfer-aid particles. Thus, the inner wall of a cavity containing the reactor tubes of the chemical reactor and the reactor tubes themselves act as radiation distributors by either absorbing radiation and re-radiating it to the heat-transfer-aid particles or reflecting the incident radiation to the heat-transfer-aid particles. The radiation is absorbed by the heat-transfer-aid particles, and the heat is then transferred by conduction to the reacting gas at temperatures between 900° C. and 1600° C. The heat-transfer-aid particles mix with the reactant gas in the radiant heat chemical reactor to sustain the reaction temperature and heat transfer rate to stay within a pyrolysis regime. The heat-transfer-aid particles along with any ash or solids are separated out from the gas products from the chemical reaction. The heat-transfer-aid particles are chemically inert to the chemical reaction occurring within the chemical reactor, are formed of solid state of matter versus a gaseous state or a liquid state, and have average effective diameter size of the heat-transfer-aid particles between 1,000,000 nanometers and 10,000 nanometers to produce a sufficient heat surface-area to mass ratio of these particles when dispersed with the reactant gas to stay within the pyrolysis regime during the chemical reaction. The heat-transfer-aid particles and any ash remnants of the biomass from the biomass gasification reaction that exit the chemical reactor are accumulated into a storage mechanism. A separator is configured to separate the heat-transfer-aid particles and any ash remnants from the gas products of the chemical reaction into the storage mechanism, which stores these particles and any ash remnants to extract their heat in order to heat a working fluid that drives an electricity generation apparatus, a steam generation unit, or other apparatus used in doing heat based processes. One or more control systems working in combination control at least the heat-transfer-aid particle feed rate, the reactive gas feed rate, and an exit temperature out of the radiant heat chemical reactor based on and sensor measurements of these parameters.

BRIEF DESCRIPTION OF THE DRAWINGS

The multiple drawings refer to the example embodiments of the invention.

FIG. 2 illustrates a graph of an embodiment of a temperature profile of a reactant gas only being processed in the radiant heat driven chemical reactor and that of a reactant gas mixed with heat-transfer-aid particles.

FIG. 3 illustrates a diagram of an embodiment of a heat transfer relationship between particulates and gas.

FIG. 4b illustrates a diagram of an embodiment of some example equations corresponding to the radiation heat transfer to a participating media.

Figure 1:
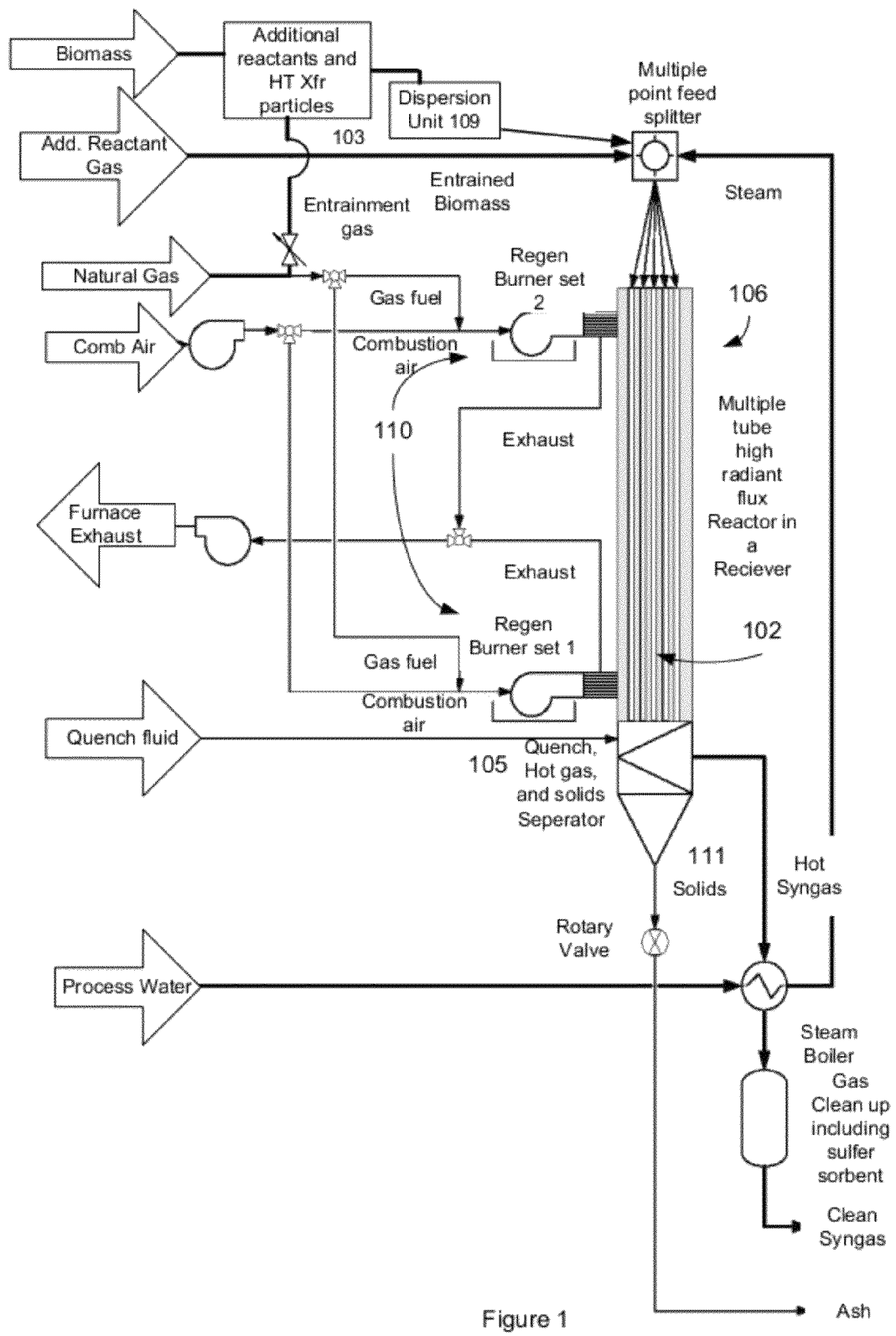
FIG. 1 illustrates a flow schematic of an embodiment for the radiant heat chemical reactor implementing a high-flux implemented and using regenerative natural gas burners as a heat source.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific chemicals, named components, connections, types of heat sources, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

In general, a number of example processes for and apparatuses associated with a radiant heat driven chemical reactor and its associated integrated chemical plant are described. The following drawings and text describe various example implementations of the radiant heat chemical reactor's design. Also, several example chemical reactions designed to be conducted in the chemical reactor are also discussed but mainly a biomass gasification reaction will be used to illustrate the radiant heat chemical reactor's properties. Also example sources of the radiant heat for the reactor may be one or more of 1) solar energy, 2) gas-fired regenerative burners, 3) nuclear power, 4) electric heaters and 5) any combination of these four. For example, the endothermic chemical reaction(s) conducted in the chemical reactor includes one or more of the following: biomass gasification, steam methane reforming, methane cracking, a dry reforming reaction, steam methane cracking to produce ethylene, and various combinations of these reactions, to be conducted in this chemical reactor using primarily the radiant heat energy. The design is aided by supplying heat-transfer-aid particles to aid chemical reaction characteristics within the chemical reactor. The heat-transfer-aid particles entrained with 1) biomass particles, 2) reactant gas, or 3) both are fed into the radiant heat chemical reactor. The surfaces of the chemical reactor act as radiation distributors to the heat-transfer-aid particles. The radiation is absorbed by the heat-transfer-aid particles, and the heat is then transferred by conduction to the reacting gas at temperatures between 900° C. and 1600° C. The heat-transfer-aid particles mix with the reactant gas in the radiant heat chemical reactor to sustain the reaction temperature and heat transfer rate to stay within a pyrolysis regime. The heat-transfer-aid particles produce a sufficient heat surface-area to mass ratio of these particles when dispersed with the reactant gas to stay within the pyrolysis regime during the chemical reaction. One skilled in the art will understand parts and aspects of many of the designs discussed below within this illustrative document may be used as stand-alone concepts or in combination with each other.

FIG. 1 illustrates a flow schematic of an embodiment for the radiant heat chemical reactor implementing a high-flux implemented and using regenerative natural gas burners as a heat source.

The radiant heat driven chemical reactor 102 has a down-draft geometry with the multiple reactor tubes in a vertical orientation located inside the cavity of the thermal receiver 106. The cavity of the receiver 106 encloses multiple reactor tubes of the radiant heat driven chemical reactor 102. The reactor tubes are configured to pass multiple chemical reactants including 1) methane 2) natural gas, 3) steam 4) biomass particles, 5) heat-transfer-aid particles, and 6) any combination of the five, through the tubes to cause a desired reaction such as a steam methane reaction, a gasification of the biomass particles, etc. using the thermal energy from the radiant energy. Note, the chemical reactor may also have the flames of the regenerative burners 110 internal to the reactor tubes and thus pass the chemical reactants and heat transfer aid particles exterior to the tubes but within the walls of the thermal receiver 106 containing the tubes.

A chemical reaction driven by radiant heat occurs within the radiant heat chemical reactor 102. The chemical reaction is an endothermic reaction including one or more of biomass gasification, steam methane reforming, and steam methane cracking to produce ethane; steam methane cracking to produce ethylene, and other similar hydrocarbon decomposition reactions, which are conducted in the radiant heat chemical reactor 102 using the radiant heat. In an embodiment, particles of biomass are gasified in the presence of a steam ($H_2O$) carrier gas and methane ($CH_4$) in a simultaneous steam reformation and steam biomass gasification reaction to produce reaction products that include hydrogen and carbon monoxide gas using the ultra-high heat flux thermal energy radiated from the inner wall and then into the multiple reactor tubes. The steam reacts with both the biomass and the methane, but the biomass and methane do not react with each other. A steam ($H_2O$) to carbon molar ratio is in the range of 1:1 to 1:4, and the temperature is high enough that the chemical reaction occurs without the presence of a catalyst.

Figure 8:
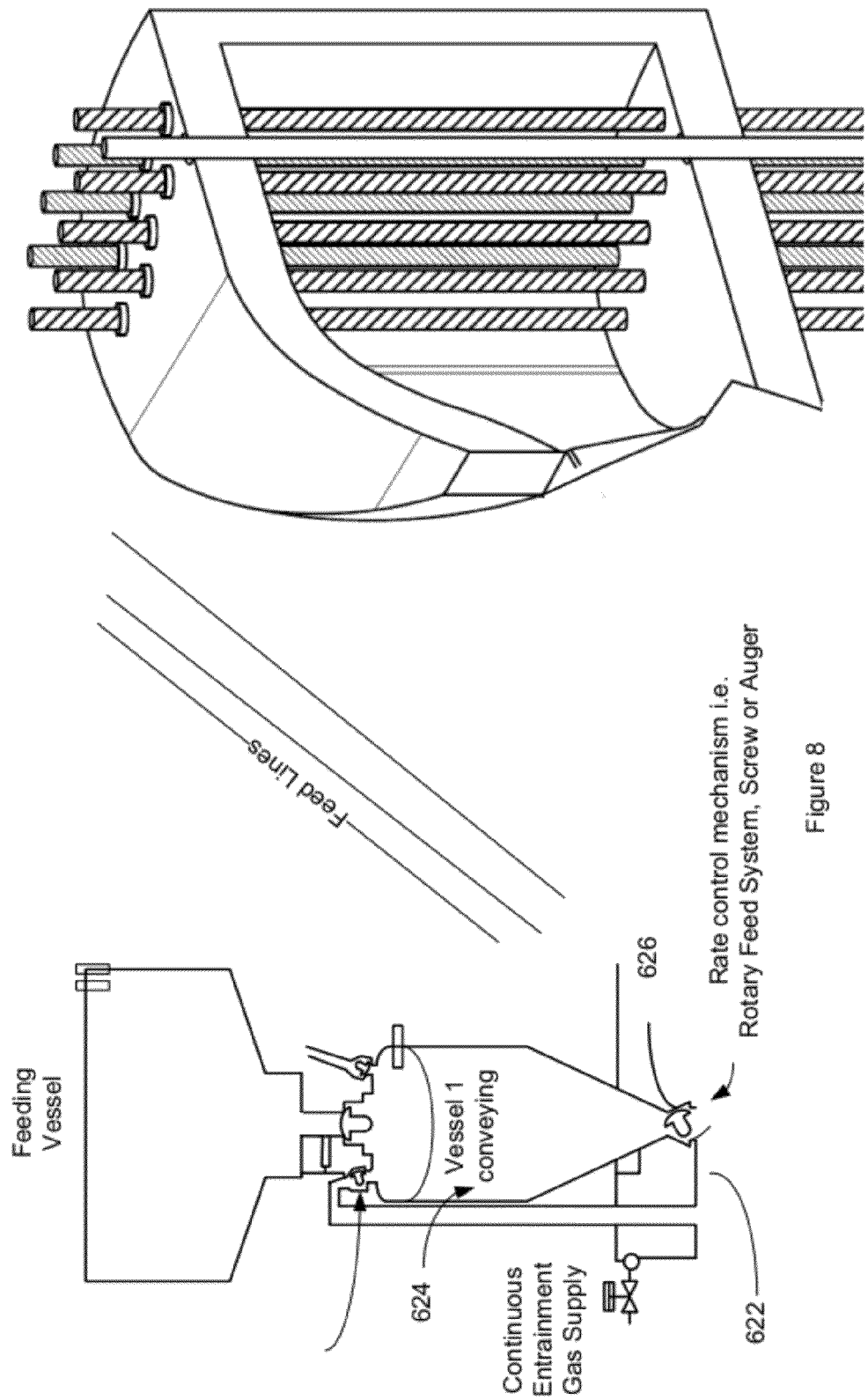

One or more feed lines 103 add heat-transfer-aid particles entrained with 1) biomass particles, 2) reactant gas, or 3) both into the radiant heat chemical reactor 102 (also see FIG. 8 for example).

The gas-fired regenerative burners 110 supply heat energy to the chemical reactor 102 to aid in causing the radiant heat driven chemical reactor to have a high heat flux. The inside surfaces of the chemical reactor 102 absorb or highly reflect the concentrated energy from the regenerative burners 110 positioned along the walls of the receiver 106 cavity to cause energy transport by thermal radiation and reflection to generally convey that heat flux to the biomass particles, heat transfer aid particles and reactant gas inside the chemical reactor. Thus, the inner wall of the cavity of the thermal receiver 106 and the multiple tubes act as radiation distributors by either absorbing radiation and re-radiating it to the heat-transfer-aid particles or reflecting the incident radiation to the heat-transfer-aid particles.

The indirect radiation driven geometry of the radiant heat chemical reactor 102 uses radiation as a primary mode of heat transfer to the heat-transfer-aid particles, the reactant gas, and any biomass particles entrained with the heat-transfer-aid particles. The radiation is absorbed by the heat-transfer-aid particles, and the heat is then transferred by conduction to the reacting gas and any biomass particles present at temperatures between 900° C. and 1600° C. The heat-transfer-aid particles mixed with the reactant gas in the radiant heat chemical reactor 102 sustain the reaction temperature and heat transfer rate to stay within a pyrolysis regime. The radiant heat chemical reactor 102 uses an ultra-high heat flux and high temperature that is driven primarily by radiative heat transfer, and not convection or conduction.

An inner wall of the receiver 106 cavity and the reactor tubes may be made of materials to allow them to be operated at high, >1200 degrees C., wall temperatures to enable the high heat transfer rates, rapid reaction kinetics of the very short residence time, and high selectivity of carbon monoxide and hydrogen produced from the gasification reaction for syngas. Alternatively, the tubes and walls are coated with such materials.

The heat-transfer-aid particles are chemically inert to the chemical reaction occurring within the chemical reactor, are formed of solid state of matter versus a gaseous state or a liquid state, and may have average effective diameter size of the heat-transfer-aid particles between 1,000,000 nanometers and 10,000 nanometers to produce a sufficient heat surface-area to mass ratio of these particles when dispersed with the reactant gas to stay within a pyrolysis regime during the chemical reaction.

One or more feed lines 103 supply biomass particles to be entrained with the heat-transfer-aid particles. The heat-transfer-aid particles are mixed with the reactant gas and the biomass particles in the radiant heat chemical reactor 102. The heat-transfer-aid particles sustain the reaction temperature and heat transfer rate to stay within a pyrolysis regime while a mass of the particles of biomass decreases during the biomass gasification reaction as the particles travel through the radiant heat chemical reactor. The biomass particles are consumed/turn to ash.

A dispersion unit 109 is configured to make sure the heat-transfer-aid particles are evenly dispersed in the gas phase with the reactant gas and any biomass particles.

A pyrolysis regime may include the thermochemical decomposition of organic material at elevated temperatures without the participation of oxygen. During this pyrolysis regime, the simultaneous change of chemical composition and change of state of potentially all or some of the physical phase of the original organic material, if not a gas already, occurs, and the changes are irreversible. Larger hydrocarbon molecules decompose into smaller constituent parts.

Convection biomass gasifiers used generally on coal particles typically at most reach heat fluxes of 5-10 kW/m^2. The high radiant heat flux biomass gasifier will use heat fluxes significantly greater, at least three times the amount, than those found in convection driven biomass gasifiers (i.e. greater than 25 kW/m^2). Generally, using radiation at high temperature (>950 degrees C. wall temperature), much higher fluxes (high heat fluxes greater than 80 kW/m^2) can be achieved with the properly designed reactor. In some instances, the high heat fluxes can be 100 kW/m^2-250 kW/m^2. For heat transfer limited reactions, the size of capital equipment is reduced linearly with the flux, and capital cost is greatly reduced. Typical chemical reactors, all driven by convection and/or conduction, simply cannot achieve these flux rates or size of process equipment.

Rather than using a complex configuration (microchannels, very small diameter tubes, etc) for increasing convective surface area, the reactor can use a very large tube and allow the large surface area to volume ratio of the particles flowing within the tubes to improve convection heat transfer to gas phase reactants. The particles act as direct absorbers, effectively increasing the emissivity of the particle-laden gas stream. Radiation heat transfer increases with the fourth power of temperature, so the absorbing particles can absorb very high flux from the wall with a very small temperature differential. Their high surface area then allows effective transfer to the gas with a low temperature differential between gas and particulates. A structured packing with a very open structure (so that heat transfer within the structure is driven primarily by radiation) works in a similar manner. With this method, the reactors can be simple large tubes, with low manufacturing cost, well understood fluid dynamics, and simpler scaling relations than the convection optimized structures for competitive chemical reactors.

After the reaction in the chemical reactor occurs, then rapid cooling occurs to capture the reaction products. A quench zone 105 is located immediately downstream of an exit of the chemical reactor 102 to immediately quench via rapid cooling the chemical reaction products including any hydrogen molecules, carbon monoxide molecules, and the ash and heat transfer aid particles exiting the chemical reactor 102. This achieves within 10 seconds a temperature after quenching of 800 degrees C. or less, which is below a level to reduce coalescence of ash remnants of the biomass particles. At the exit of the gasification reaction zone in the reactor tubes of the chemical reactor 102, two or more tubes form into a group at the exit and that group combines their reaction products and un-reacted particles from the biomass gasification into a larger pipe per group that forms a portion of the quench zone. One or more sprayers inside the larger pipe inject a cooling fluid directly into the reaction product syngas stream to make the temperature transition from the at least 900 degree C. exit temperature to less than the 800 degrees C. within the 0.1-10 seconds to prevent metal dusting corrosion of the pipe walls.

A hygiene agent, such as a sulfur removal sorbent, present in either the biomass gasification process or initially introduced in the quench zone, may be injected to reduce an amount of sulfur present in a syngas stream exiting the quench zone 105. One or more hot particle filters to remove particulates from the syngas stream exiting the quench zone, where the particulates are sent to an ash-holding vessel. Thus, a separator coupled downstream of the radiant heat chemical reactor separates out the heat-transfer-aid particles from gas products from the chemical reaction. The heat aid particle storage mechanism 111 is configured to accumulate the heat-transfer-aid particles and any ash remnants of the biomass from the biomass gasification reaction that exit the chemical reactor. The separator is configured to separate the heat-transfer-aid particles and any ash remnants from the gas products of the chemical reaction into the heat aid particle storage mechanism 111, which stores these particles and any ash remnants to extract their heat in order to heat a working fluid that drives an electricity generation apparatus, a steam generation unit, or other apparatus used in doing heat based processes. The products from the chemical reaction are supplied to a downstream chemical synthesis plant and potentially to a further on-site a gasoline synthesis plant.

A boiler steam supply may provide steam to the radiant heat chemical reactor and make up at least part of the reactant gas supplied to the reactor. The heated working fluid from the heat aid storage mechanism 111 may be used in the boiler to generate the steam.

A control system (also see FIG. 9 for example) may be configured to control at least the heat-transfer-aid particle feed rate, the reactive gas (e.g. CH4, Steam) feed rate, and an exit temperature out of the radiant heat chemical reactor based on and sensor measurements of these parameters conveyed back to the control system.

Each set of regenerative burners 110 controlled by the control system may work as follows. Regeneration uses a pair of burners 110, which cycle to alternately heat the combustion air or recover and store the heat from the furnace exhaust gases. When one regenerative burner is firing, the other is exhausting the furnace gases. Exhaust gases pass through the regenerative burner body and into a media case, which contains refractory material. The refractory media is heated by the exhaust gases, thus recovering and storing energy from the flue products. When the media bed is fully heated, the regenerative burner currently firing is turned off and begins to exhaust the flue products. The regenerative burner with the hot media bed begins firing. Combustion air passes through the media bed and is heated by the hot refractory. Air preheat temperatures within 300 degrees F.-500 degrees F. of the furnace temperature are achieved resulting in exceptionally high thermal efficiency.

A high temperature is achieved and maintained by the control system with the use of the heat-transfer-aid particles for these temperature-favored equilibrium reactions. The design of the chemical reactor 102 drives chemistry to desired products at these temperatures. Thus, in the case of endothermic reactions, this yields a higher conversion rate into products from the chemical reaction (and in an example case resulting in higher quality syngas). This includes biomass gasification (elimination of tars, and the secondary reformation reactions of by-product CH4 to CO and H2), steam methane reforming, ethylene production by steam ethane reforming, methane cracking for carbon black and hydrogen formation, and other high temperature chemical reactions.

Note, biomass gasification is an endothermic process. Energy must be put into the process to drive it forward. Typically, this is performed by partially oxidizing (burning) the biomass itself. Between 30% and 40% of the biomass must be consumed to drive the process, and at the temperatures which the process is generally limited to (for efficiency reasons), conversion is typically limited, giving still lower yields. A typical theoretical gasoline yield for a standard gasification process is 50 gallons of gasoline/ton of biomass. The radiant heat driven chemical reactor 102 process uses an external source of energy (such as concentrated solar energy or the regenerative burners) to provide the energy required for reaction, so none of the biomass need be consumed to achieve the conversion. This results in significantly higher yields (100 gallons of gasoline per ton). As the energy source being used to drive the conversion is renewable and carbon free, (in the case of concentrated solar energy) it is eligible for carbon credits and/or will not be adversely affected by carbon penalties in the future.

Competing reactors for these reactions are not able to operate at these high temperatures because they have a combination of the following two:

Catalysts—catalytic systems are typically used for kinetically limited reactions, and must remain below certain temperatures to avoid sintering of the catalytic sites, which would reduce the yields and productivity of the reactor. This design allows chemical reactions without the use of a catalyst.

Materials—materials of reactor construction are not high temperature compatible or do not have the high thermal conductivity required to pass heat to the chemical reaction effectively. The configuration of these reactors is typically complex to improve contact area for heat transfer/catalysis, which does not lend itself to being manufactured out of the high temperature ceramic materials used for this implementation.

Thus, the high reactor temperatures allow certain chemical reaction, such as steam methane reforming (SMR), to occur at high throughput and without the aid of a catalyst, resulting in lower production costs over low-temperature systems that require use of an expensive catalyst that must be periodically replaced.

The radiant heat chemical reactor may be a single stage in which the chemical reaction occurs within the single vessel of the chemical reactor 102. In an embodiment, the chemical reactor 102 is made up of multiple discrete stages in which the reaction occurs.

FIG. 2 illustrates a graph of an embodiment of a temperature profile of a reactant gas only being processed in the radiant heat driven chemical reactor and that of a reactant gas mixed with heat-transfer-aid particles. The graph shows for the same amount of radiant heat flux generated by the tubes and walls of the radiant heat driven chemical reactor for the reactant gas only being processed in the chemical reactor and the reactant gas mixed with heat-transfer-aid particles being processed in the chemical reactor. The reactant gas mixed with heat-transfer-aid particles reaches above 1200 degrees C. for that heat flux amount and the reactant gas only reaches around 800 degrees C. for that same amount of heat flux.

The heat-transfer-aid particles can be used to help in thermal heat transfer and heat exchange. The heat-transfer-aid particles mixed with the biomass particles also provide a base line minimum amount of particle surface area to absorb the radiation energy from the walls and tubes throughout the duration of the chemical reaction within the chemical reactor; and thus, act as radiation heat transfer agents to the reacting gas and the biomass particles. Note, the biomass particles hopefully are fully consumed and turn to ash by the end of the biomass gasification reaction.

In the radiant particle reactor radiant energy is transferred to gas mainly through heat-transfer-aid particles. The heat-transfer-aid particles entrain in a gas flow to heat that gas through coupling of radiation from the wall, tubes, etc. The small heat-transfer-aid particles are effective to couple radiant heat transfer from the wall and then transfer large amounts of energy to the reactant gas in this manner; in contrast to, convection-only heat transfer coupled to the reactant gas. Radiation is the primary mode of heat transfer to the heat transfer aids and chemical reactants from the reactor tube walls, and conduction, convection, or some combination of the two are the secondary modes of heat transfer from the cavity walls and reactor tubes.

The reason for introducing heat-transfer-aid particles into the system is to improve particle-to-gas heat transfer. The exit gas temperature may be a key measure of this heat transfer; in cases where wall convection is weak, nearly all of the energy must be provided through this radiant heat transfer mode. The amount of energy transferred to the reactant gas through the particles can be calculated by measuring the differential enthalpy between cases with no particles and cases with varying amounts of particles. As the particle feed rate increases, the heat transferable increases linearly. As the particle size decreases, the heat transferred increases in a quadratic fashion. Note, deviation from these trends and the theoretical analysis indicate that either 1) the particles are not well dispersed or distributed or 2) convective heat transfer between the particles and gas or radiative heat transfer between the wall and particles behaves less optimally than the theory would predict.

FIG. 3 illustrates a diagram of an embodiment of a heat transfer relationship between particulates and gas.

The Nusselt number (Nu) may be a ratio of convective to conductive heat transfer across a boundary. Convective Transport may be expressed as follows.
The heat transfer rate Q=hA Delta T (Temperature difference)
Nu=2=hD/Kg where Nu is the Nusselt number; h is the convective heat transfer coefficient, D is the diameter of the particle, Kg is the thermal conductivity of the gas. and $$A = NpAp = (6mt/Pp\Pi D^3)(\Pi D^2)$$

$$\text{Delta } T = (QPp/12K_g mt)D^2$$

The heat to mass ratio may be fixed depending on lignin/char content of biomass particles. Overall, the above indicates that particle diameter much more important than residence time within the chemical reactor.

In addition, heat transfer to gases from hot solid surfaces is limited to conduction in laminar flow and convection (Newton's Law of Cooling) in turbulent flow. The heat flux is governed by the temperature difference between the hot surface and the bulk flow by the following equation:

$$Q = hA \text{ delta } T$$

Here h is the film transfer coefficient, with units of flux/degree. For gases, h ranges between 5 and 100 W/m-K, which gives heat fluxes that range between 0.5 kW/m$^2$ and 20 kW/m$^2$ for a 100 K temperature difference. For biomass gasification and other high temperature chemistries, materials of construction limitations suggest that temperatures should be kept as low as practical. This necessarily restricts the solid-gas temperature difference, and thus the overall heat flux. If significant amounts of heat are to be transferred, the required surface area should increase significantly by the addition of small heat-transfer-aid particles.

Flux from radiation is related to the fourth power of the absolute temperature; this non-linearity allows progressively greater fluxes for a fixed temperature difference at higher absolute levels of temperature. Unfortunately, gases are transparent to radiation at most wavelengths. Solid particulates, on the other hand, have much better absorbance, and will efficiently receive radiation from a hot surface.

This radiant heat driven chemical reactor uses entrained solid particulates as absorbers of radiation. This radiation will drive particle temperature higher, allowing convective transport between the gas and the particulates. This convective transport has three advantages over the transport from the wall. First, the film transfer coefficient is higher for particle-gas transfer than for wall-gas transfer. At a minimum, for creeping flow around a spherical particle:

$$Nu = 2 = hD/Kg$$

Here, D is the particle diameter. As this diameter decreases, the heat transfer coefficient gets higher, improving interphase heat transport. Second, if the particulates are evenly dispersed in the gas phase, conduction distances in the gas phase are shorter than in wall-gas transfer, decreasing the likelihood of conduction limited cold pockets in the flow. Finally, due to the high surface-area to mass ratio of small particulates (D<1 mm), very large amounts of surface area can be provided. This reduces the required gas-particle temperature difference for a set level of heat transfer. At high wall temperatures where radiation is a significant factor, this will allow the gas to approach the wall temperature by coupling radiation to the particles to convection from the particles to the gas.

The heat-transfer-aid particles added with biomass particles in the chemical reactor both radiate heat and conductively convey heat to the biomass particles and the reactive gas, which allows the feed biomass particles to be kept as small as possible. The biomass particles may have an average smallest dimension sized between 10 micrometers (um) and 1000 um so they can almost immediately vaporize/flash upon entering the chemical reactor, but the heat-transfer-aid particles continue conveying the radiated heat from the tubes and the wall to the product gas at high transfer rates and at higher temperatures throughout the biomass gasification process within the chemical reactor.

Heat transfer at the particle level can be represented as follows.

$Q_{sens} = m_p C_p \Delta T$. Radiative energy $Q_{rad}$ is input into the particle and both convection energy $Q_{conv} = h(T_{ps} - T_g)A_p$ and $Q_{rxn} = \Sigma v_i \Delta H_{f,i}(\delta N_\Gamma/\delta_f)$ are output by the particle. This indicates as the particles get smaller, radial temperature gradients are less important and as the particles get smaller to a point where radiation absorption is still efficient, then heat and mass transfer to gas improves.

Figure 4A:
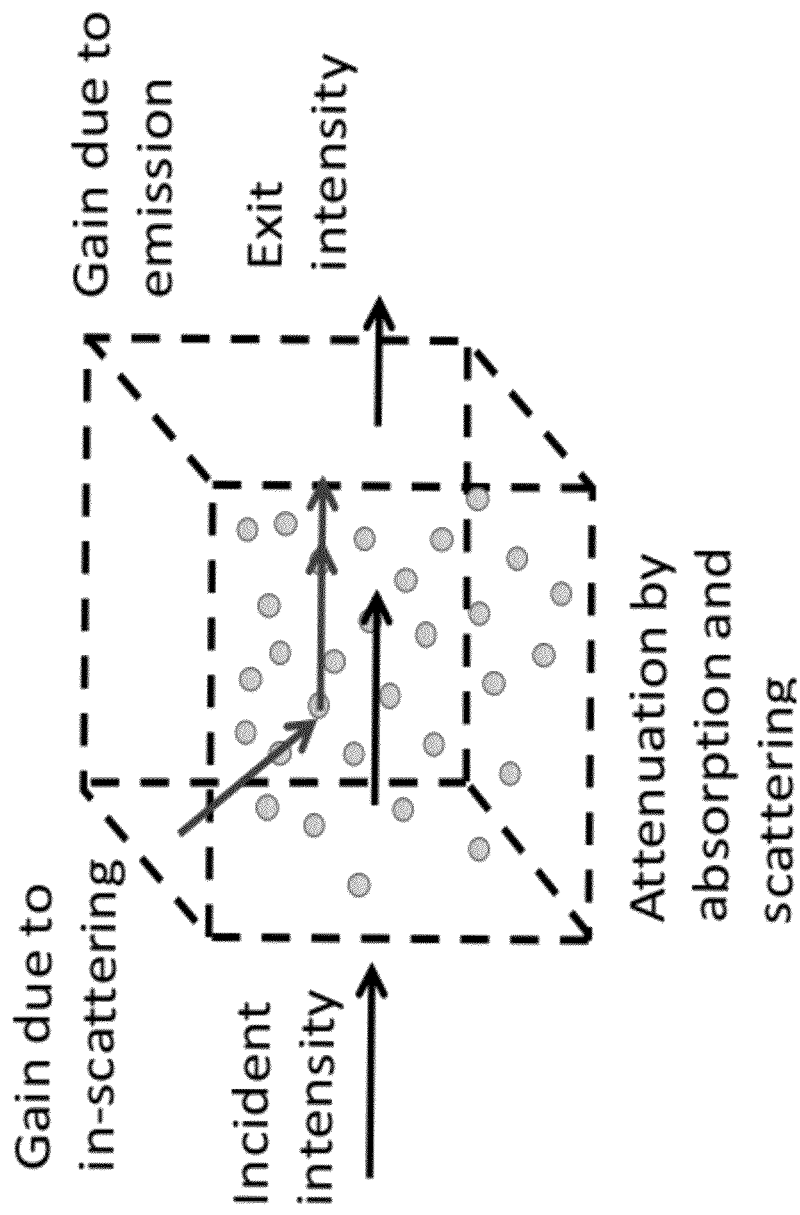
FIG. 4a illustrates a diagram of an embodiment of radiation heat transfer to a participating media.

FIG. 4a illustrates a diagram of an embodiment of radiation heat transfer to a participating media. FIG. 4b illustrates a diagram of an embodiment of some example equations corresponding to the radiation heat transfer to a participating media. Radiation heat transfer to participating media may be expressed as follows. Incident intensity is input into the particle and gain due to in-scattering occurs. Gain due to emission occurs but attenuation by absorption and scattering occurs. Exit intensity is then output from the particle. Referring to FIG. 4b, the equations corresponding to this relationship may be as follows.

$$\frac{di_\lambda}{dS} = \underbrace{-(a_\lambda + \sigma_\lambda)i_\lambda}_{\text{Absorption and scattering}} + \underbrace{a_\lambda i_{\lambda b}}_{\text{Emission}} + \underbrace{\frac{1}{4\pi}\int_0^{4\pi} i_\lambda \sigma_\lambda \Phi(\theta, \phi)d\omega}_{\text{In-scattering}}$$

$$-\nabla \cdot \vec{q}_r = \int_0^\infty K_\lambda \int_0^{4\pi} i_\lambda d\omega d\lambda - 4\pi \int_0^{4\pi} K_\lambda i_{\lambda b} d\lambda$$

Referring to FIG. 4a, the use of particles with the chemical reactor has great potential benefits for entrained flow indirect gasification and for indirectly heated high temperature gas chemistries (e.g. steam methane reforming, ethylene production via steam ethane cracking). In indirectly heated biomass gasification (wall temperatures >1000° C.), the biomass can react effectively throughout the pyrolysis regime. However, by the time the high temperature reactions are reached (which can consume up to 40% of the total reaction energy), there is not enough biomass/char/ash particle surface area to allow for effective heat transfer to the gas phase. In order to eliminate methane (CH4) and C2+ hydrocarbons from the system, exit gas temperatures should be maintained at greater than 1200° C. and preferably above 1250° C. Accordingly, the chemical reactions of hydrocarbons, including biomass and natural gas, at higher temperature reduce the content of CH4 as part of the product gases exiting the reactor. Standard, convective methods of transferring the required heat for finishing the reactor to the gas phase would include increasing the wall temperature or adding greater surface area to the wall. However, neither of these is desirable given standard system constraints. Materials of construction limit the degree to which wall temperatures could be increased, and adding surface area in the flow path of a solid laden flow is likely to create plugging. Instead, by adding small, inert particulates, there are more radiant absorbers to transfer heat to the gas phase, allowing for the chemistry to be finished at very high temperatures without inordinately increasing the wall temperature.

For other gas chemistries, the ability to couple radiation into the gas flow allows for reactions to be operated at high temperatures where catalysts are no longer required. This has multiple advantages. First, these endothermic reactions (e.g. steam methane reforming, steam ethane reforming) are equilibrium limited; and thus increasing the temperature improves the equilibrium performance, which increases both yield and throughput. Catalytic systems are unable to reach higher temperatures due to deactivation (e.g. sintering) and fouling (e.g. coking) reactions that destroy the catalyst surface. However, this is not an issue in a pyrolysis thermal regime that needs no catalyst. Second, moving away from catalysts eliminates an expensive consumable from the plant and reduces the requirements for process temperature and pressure control (catalysts are fragile). Finally, high temperatures may open up chemistries that are slow at low temperature for which no workable catalyst exists.

The average effective diameter size of the heat-transfer-aid particles may be between 1,000,000 nanometers and 10,000 nanometers, which is at least ten times greater than the wavelengths of absorbed radiation from the walls and tubes. The heat-transfer-aid particles may be also made of refractory materials that retain strength at least up to temperatures of 1450 degrees C. The properties of the heat-transfer-aid particles include: the small diameters (preferably <1,000,000 nm to 100 micron); the solid matter form; chemically inert to the chemical reaction occurring the chemical reactor; a high emissivity of eighty percent or greater; a low heat capacity (<500 J/kg-K); a low density (<1000 kg/m$^3$, preferably <500 kg/m$^3$); a low thermal conductivity (<10 W/m-K); and the refractory material that retains its strength at least up to temperatures of 1450° C. The materials of the heat-transfer-aid particles include silica, sand, Carbo HSP, other proppants, some forms of coal and petroleum coke, and recycled ash products from the biomass gasification reaction exiting the chemical reactor, and any combination of these materials, to improve heat transfer all throughout the biomass gasification reaction. The heat transfer aid particle size is decreased to a size point where it is sized still be a good radiation absorber but the small diameter gives a high surface area to mass ratio that increases the maximum gas dispersed with particles temperature that mixture can achieve.

The heat-transfer-aid particles can also mitigate soot formation along with CO2 formation. The heat-transfer-aid particles give greater effective flux from the surfaces (i.e. walls) reducing gasifier size and capital cost. The heat-transfer-aid particles allow finishing of the biomass gasification reaction at a high temperature in single vessel, which results in a lower cost and complexity to run on an industrial scale. The heat-transfer-aid particles allows coupling of radiant energy into gas chemistries, allowing operation in thermal, non-catalytic temperature regime and with lower area/capital cost, higher equilibrium conversions, looser control requirements, and lower operating costs.

Heat-transfer-aids as additives may also include 1) chemicals that react to form small solid, heat-transfer-aid particles such as metal oxides, and 2) complex hydrocarbons that break apart during the reaction. Note, the heat transfer aids may also have particles generated in-situ, for example, cracking methane to nano-scale carbon particles that would subsequently react with steam in the biomass gasifier. Thus, sooting may be used to generate these particles. Note, alternatively, the chemical reactor may possibly add oxygen directly for in-situ heat generation if enough heat is not achieved by the heat transfer aid. Adding more oxygen higher in furnace/gasifier tube also would help out to burn out soot formation.

Figure 5:
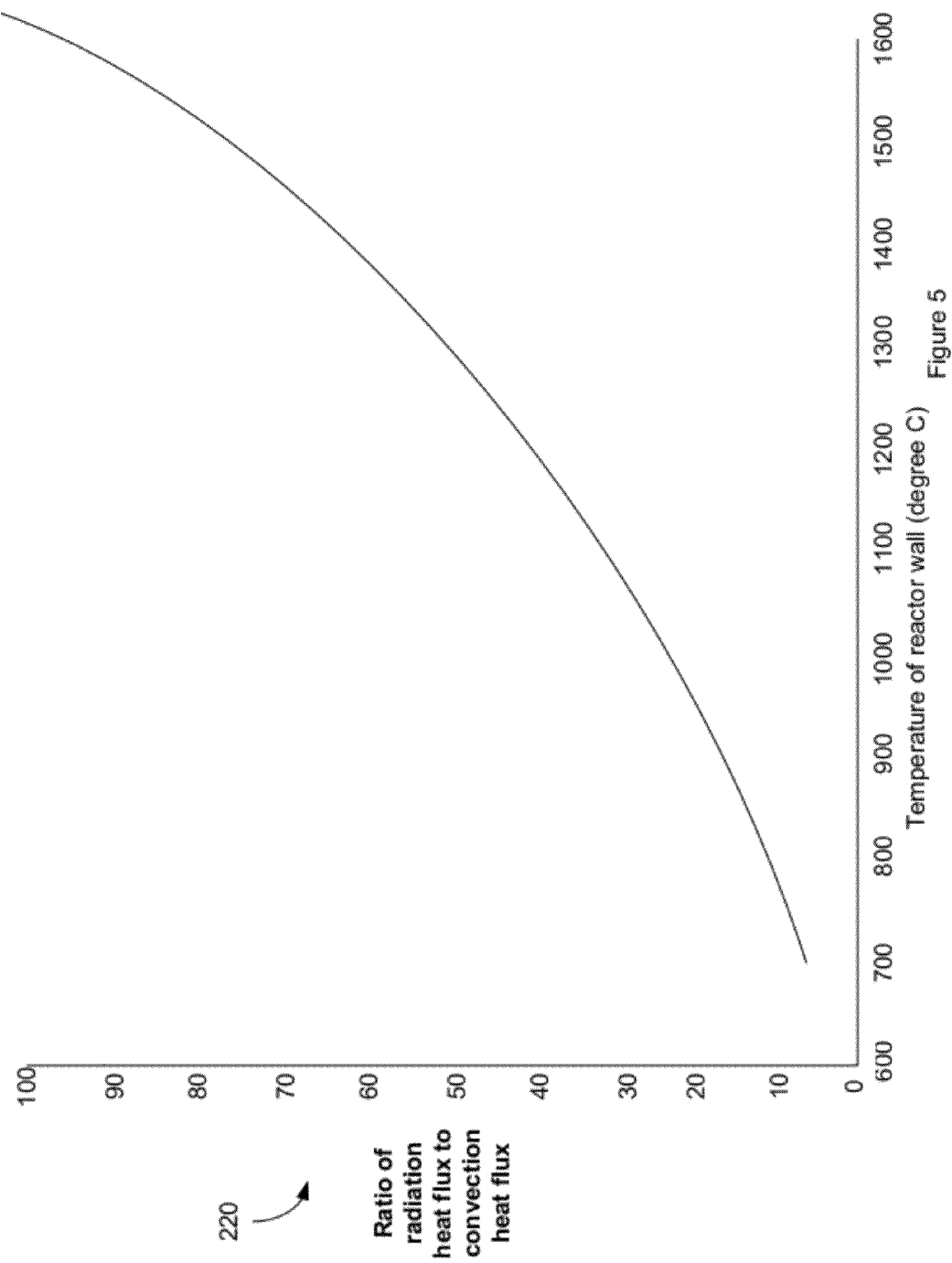
FIG. 5 illustrates a graph of a ratio of radiation heat flux to convection heat flux at various temperatures for an embodiment of the radiant heat driven chemical reactor.

FIG. 5 illustrates a graph of a ratio of radiation heat flux to convection heat flux at various temperatures for an embodiment of the radiant heat driven chemical reactor. The graph illustrates that radiation is the dominant heat transfer mechanisms at the high operating temperatures of the high-flux chemical reactor. The graph 220 shows for a reactor tube temperature of around 700 degrees, then the ratio of radiation heat flux to convection heat flux is around 7 to 1. As the reactor tube temperature increases to around 1400 degrees, then the ratio of radiation heat flux to convection heat flux is around 60 to 1. As the reactor tube temperature increases to around 1600 degrees, then the ratio of radiation heat flux to convection heat flux is around 100 to 1. The ratio of radiation heat flux to conduction heat flux is similarly quite discrepant at these high temperatures in this radiant heat driven chemical reactor design.

Generally, the operational temperature of the high heat flux driven chemical reactor is maintained at greater than 900 degrees C. and up above 1100 to 1600 degrees C. in most cases. The values of heat flux at these operating temperatures are high in this design. For example, a high heat flux of 100-250 kW/m$^2$ is achieved by radiative heat transfer through the selected material of the reactor tube walls at a high temperature of equal to or greater than 1000 degrees C. wall temperature.

The control system can be configured to maintain the temperature of the chemical reactor to be above 1200 degrees C. in order to eliminate methane and C2+ hydrocarbons from the products exiting the radiant heat chemical reactor. Note, by feeding $CH_4$ (which does not react as $CH_4 \rightarrow C + 2H_2$ until ~1200)°, a much higher heat load can be placed on the process at high temperature.

The entrained-flow of chemical reactants into the chemical reactor may start when the radiant heat driven chemical reactor is at at least a minimum operational temperature of 750 degrees Celsius and preferably greater than 1000 degrees Celsius. The chemical reactor can convert carbonaceous biomass materials into carbon monoxide and hydrogen by reacting the raw particles of biomass material with the steam for biomass gasification, and the steam with the supplemental methane for steam reforming at high temperatures, 700-1600 degrees C., with a controlled amount of steam, natural gas, and any combination, which then results in the gas mixture of synthesis gas.

The ability to operate at elevated reactor tube temperatures in combination with gas-phase heat transfer aids drives endothermic, heat transfer limited (as opposed to kinetically limited), chemical reactions to occur at shorter residence times and with a significant (20-50 times) reduction in the required area of heat transfer surface, resulting in higher conversion rates and reduced formation of undesirable byproducts (such as tars in the case of incomplete biomass gasification), producing a higher quality and quantity of product gas (e.g. syngas in the case of biomass gasification). The design gives a large throughput due to high operating temperatures, shorter residence times, and multiple reactor tubes. The design increases conversion efficiency at the same or less residence time within the reactor due to the combination of high heat flux and higher reaction temperatures, thus increasing overall plant conversion efficiencies & yields at lower equipment capital costs. The design reduces required surface area of reactor tubes and walls by 20-50 times, thus reducing the materials cost for reactor tubes & manifolds (SiC or super-alloys). The design reduces production of unwanted secondary byproducts (e.g. tar in biomass gasification). Thus the design reduces cost & complexity of gas cleanup systems prior to subsequent unit operations; and reduces cost, complexity and handling/disposal requirements for inert solid byproducts (e.g. ash) as a potential contamination of a saleable byproduct or as a waste disposal problem because no tar was produced to contaminate the ash. An additional advantage of the reduced required surface area is that corrosion of key components can be slowed because corrosion rates are surface area specific.

As discussed, the radiant heat driven chemical reactor is driven by the high flux and high temperature that the materials and accordingly the multiple tubes design of the reactor and the wall of the cavity are built to withstand and achieve this high flux and high temperature. High flux gives lower capital cost, decreasing production cost for end products (e.g. gasoline) and improving return on investment. The higher temperature enables better per pass conversion of chemical reactions to occur without catalysis, improving productivity for a given capital investment and reducing overall operating costs (less recycle/wasted feedstock). Additionally, high temperature allows operation in regimes where unwanted byproducts (e.g. tar in biomass gasification) are not produced, reducing the necessary capital investment and operational costs of additional processing steps.

Figure 6:
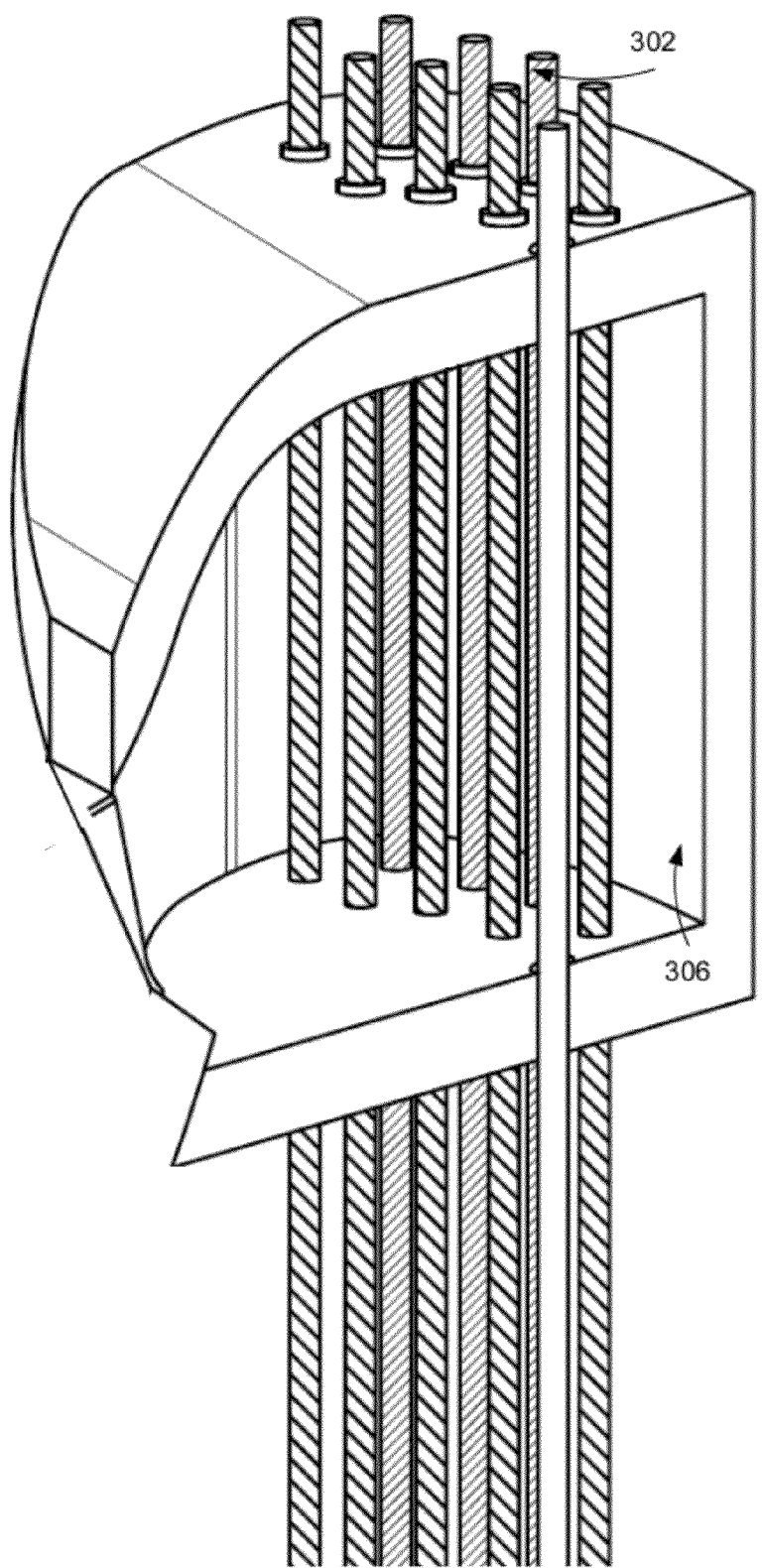
FIG. 6 illustrates a cut away view of an embodiment for the receiver cavity enclosing offset and staggered reactor tubes in the chemical reactor.

FIG. 6 illustrates a cut away view of an embodiment for the receiver cavity enclosing offset and staggered reactor tubes in the chemical reactor. The thermal receiver 306 has a cavity with an inner wall. The radiation driven geometry of the cavity wall of the thermal receiver 306 relative to the reactor tubes 302 locates the multiple tubes 302 of the chemical reactor as offset and in a staggered arrangement inside the receiver 306. A surface area of the cavity walls is greater than an area occupied by the reactor tubes 302 to allow radiation to reach areas on the tubes 302 from multiple angles. The inner wall of the receiver 306 cavity and the reactor tubes 302 exchange energy primarily by radiation, with the walls and tubes 302 acting as re-emitters of radiation to achieve a high radiative heat flux reaching all of the tubes 302, and thus, avoid shielding and blocking the radiation from reaching the tubes 302, allowing for the reactor tubes 302 to achieve a fairly uniform temperature profile from the start to the end of the reaction zone in the reactor tubes 302.

The multiple tubes are vertically orientated with the heat-transfer-aid particles, biomass particles and reactant gas entering at or near the top of the tubes. The control system maintains the temperatures above 900° C. to cause the rapid gasification reaction of dispersed falling biomass particulates and reactant gas with the heat-transfer-aid particles present to produce a resultant stable ash formation, complete amelioration of tar to less than 500 milligrams per normal cubic meter, and the production of the hydrogen and carbon monoxide products.

The chemical reactor may have a variety of temperature sensors to measure inlet gas temperature, wall temperature, exit temperature, and any combination of these to provide feedback to the control system.

Figure 7:
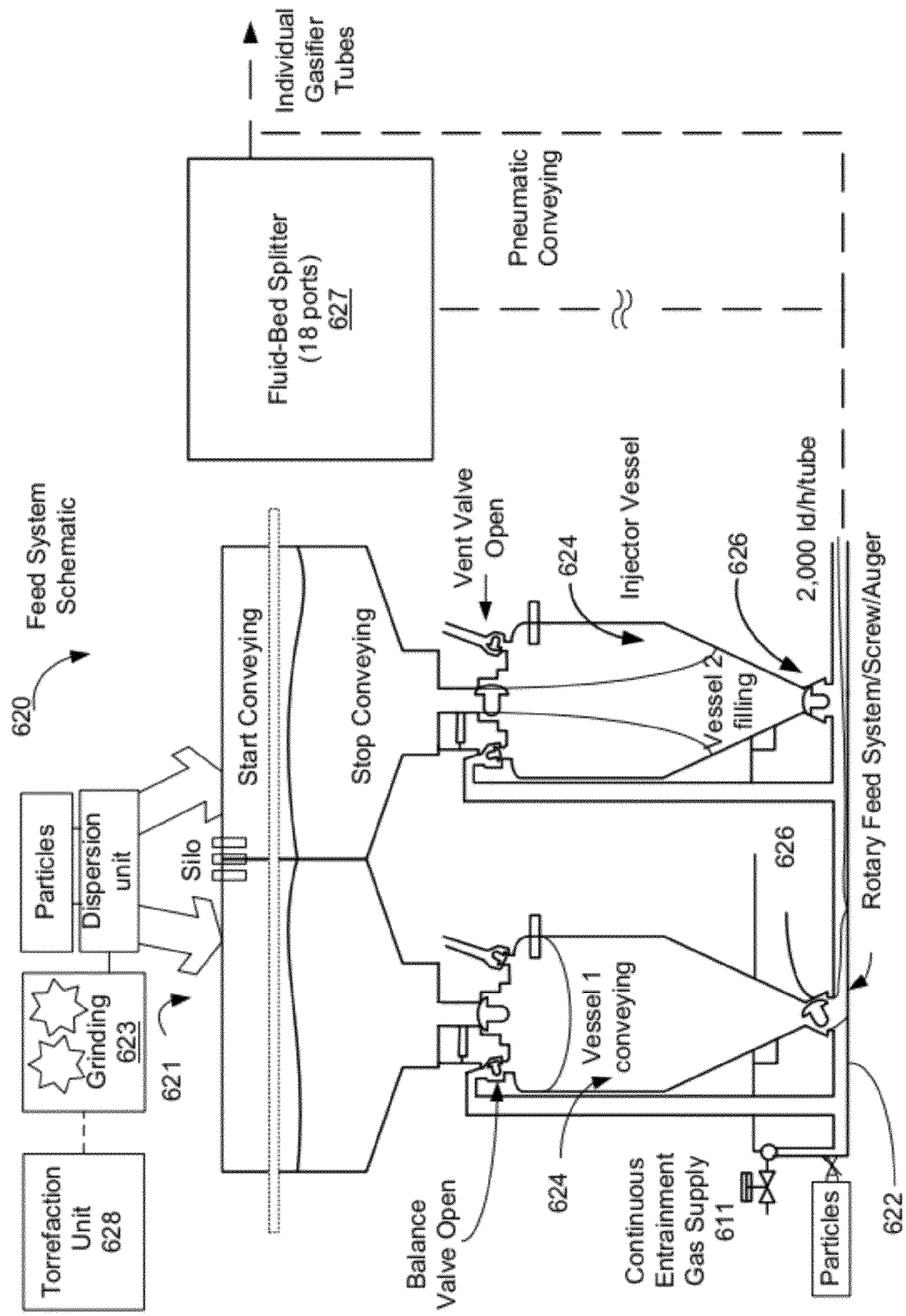
FIGS. 7 and 8 illustrate block diagrams of embodiments for an entrained-flow biomass feed system that supplies the biomass particles and heat-transfer-aid particles in a carrier gas to the chemical reactor.

FIGS. 7 and 8 illustrate block diagrams of embodiments for an entrained-flow biomass feed system that supplies the biomass particles and heat-transfer-aid particles in a carrier gas to the chemical reactor.

The entrained-flow biomass feed system 620 can include a pressurized lock hopper pair 624 that feeds the biomass to a rotating metering feed screw 622 and then into an entrainment gas pipe at the exit 626 of the lock hopper pair. The particles of the biomass are distributed into multiple entrainment gas lines by a flow splitter 627 to feed the two or more reactor tubes making up the chemical reactor.

In an embodiment, the high heat flux reactor and associated integrated system may also include the entrained-flow biomass feed system 620 having one or more lock-hopper pairs 624 equipped with a single multi-outlet feed splitter 627 that simultaneously feeds the particles of the biomass in pressurized entrainment gas lines into two or more tubes of the chemical reactor. The tubes may be controlled as discrete tube sets, each with two or more tubes. The gas source 611 may also supply pressurized entrainment gas in the form of recycled carbon dioxide from an amine acid gas removal step in the hydrocarbon fuel synthesis process, steam, or some other carrier gas. The multi-outlet feed splitter 627 provides and controls an amount of distribution of the particles of the biomass in the one or more pressurized entrainment gas lines that feed the two or more reactor tubes in the chemical reactor via allowing flow or no flow through a set of reactor tubes. Thus, each feeding vessel 624 of the biomass feed system supplies a feed splitter 627 that feeds, for example up to twelve reactor tubes in the chemical reactor. Each feeding vessel 624 has one or more outlets 626 configured to supply a consistent volumetric amount of biomass particles within ten percent of the demand signal amount when distributing biomass particles to the two or more reactor tubes.

The feed system may be configured to supply heat-transfer-aid particles and chemical reactants into the gasification reactor. The feed system may be configured to blend the biomass materials in the dispersion unit with the heat-transfer-aid particles prior to feeding and entraining them into the chemical reactor. The feed system may be configured to blend the heat-transfer-aid particles with the reactant gas in the entrainment gas lines as well.

The heat-transfer-aid particles may be mechanically metered and feed that parameter to the control system. The heat-transfer-aid particles are then entrained into the reactant gas flow that is then fed downward through the chemical reactor, which is vertically aligned. A separator coupled to the chemical reactor mechanically separates the heat-transfer-aid particles from the product gas stream and recovers these heat-transfer-aid particles for reuse as feedstock in the feeder system to the chemical reactor.

The recycled ash from the separator in the syngas clean up section is blended with biomass particles in the feed system to generate additional heat from both any remaining combustion and as a radiation absorption particle in order to fully utilize the remaining carbon atoms in the ash.

The high heat flux reactor and associated integrated system may also include a grinding system 623. The grinding system 623 has a grinding device that is at least one of 1) a mechanical cutting device, 2) a shearing device, 3) a pulverizing device, and 4) any combination of these that breaks apart the biomass, and a series perforated filters in the entrained-flow biomass feed system. The grinding device and perforated filters grind the partially pyrolyzed biomass from the torrefaction unit 628 to control the particle size of the biomass to be between 10 um and 1000 um. The torrefaction unit 628 is geographically located on the same site as the radiant heat driven chemical reactor and configured to be subject the biomass to partial pyrolysis with recouped waste heat from the chemical reaction in a temperature range of up to 300 degrees C. to make the biomass 1) brittle and easier for grinding, 2) dryer, less sticky, and easier to feed in a conveying system, 3) subject to less spoilage issues in storage as a torrefied biomass, as well as 4) produce off gases from the torrefaction process. The torrefaction unit 628 supplies partially pyrolyzed biomass to the grinding system 623. The torrefaction of the partially pyrolyzed biomass reduces the energy required by the grinding device to grind the biomass to the controlled particle size between 10 um and 1000 um. The off gases from the torrefaction of the biomass can be used for one or more of the 1) entrainment carrier gas, 2) an energy source for steam generation, 3) direct blending with the product gasoline, 4) a gas for the gas-fired regenerative burners or steam boilers, and 5) any combination of these.

The feedstock flexibility of being able to use multiple types of biomass without redesigning the feed and reactor process clearly gives an economic advantage over processes that are limited to one or a few available feed stocks. By heating the reactor tubes with radiant energy (which re-radiate to the particles), the problem of generating heat for the reaction and designing the reactor to conduct the reaction (essentially the endothermic/exothermic balancing problem) is eliminated.

Figure 9:
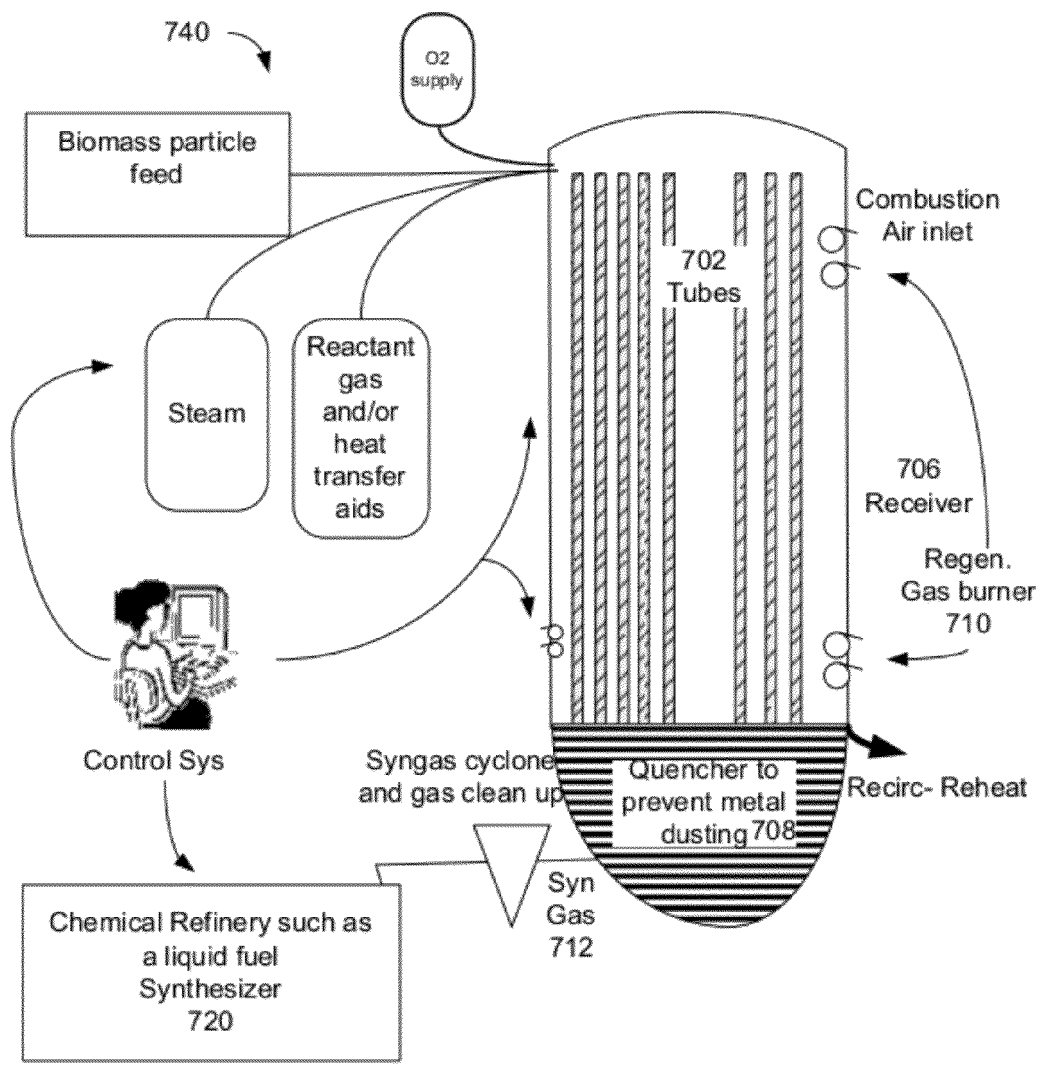
FIG. 9 illustrates a diagram of an embodiment of the radiant heat driven bio-refinery with multiple control systems that interact with each other.

FIG. 9 illustrates a diagram of an embodiment of the radiant heat driven bio-refinery with multiple control systems that interact with each other. In such a system, radiant heat energy may be provided to the chemical reactor 702. In this example, the chemical reactor may be heated by two or more sets of the gas-fired regenerative burners 710.

An entrainment carrier gas system supplies carrier gas for the particles of biomass in the feed system to the chemical reactor. The other chemical reactants, heat transfer aid particles, oxygen, and/or steam may also be delivered to the reactor tubes. As illustrated, chemical reactants, including biomass particles, may flow into the chemical reactor 702 and syngas flows out 712. The quench unit 708 may be used to rapidly cool the reaction products and prevent a back reaction into larger molecules.

The computerized control system may be multiple control systems that interact with each other. The computerized control system is configured to send a feed demand signal to feed system's to control an amount of 1) reactor tube sets to be fed particles of biomass in the chemical reactor, 2) amount of gas fired regenerative burners supplying heat, 3) rate at which particular gas fired regenerative burners supply heat, and 4) any combination of these based on control signals and the temperature measured for the chemical reactor. The control system may rely on feedback parameters including temperature of the reactor as well as feed forward parameters including anticipated changes in heat in from the burners and heat out from changes in an amount of chemical reactants and carrier gas being passed through the reactor tubes 702.

In general, the high heat transfer rates of the reactor tubes and cavity walls maintained by the control system allow the particles of biomass to achieve a high enough temperature necessary for substantial tar destruction and gasification of greater than 90 percent of the biomass particles into reaction products including the hydrogen and carbon monoxide gas in a very short residence time between a range of 0.01 and 5 seconds.

Note, the chemical reactor may have an oxygen supply line to supply an oxygen-based gas including O2, Air, and any combination of the two to the chemical reactor, and the control system is configured to control a rate of oxygen addition based on feedback from an oxygen sensor present in the chemical reactor to the control system. The heat-transfer-aid particles are generated in-situ in the chemical reactor through sooting, where CHx hydrocarbons are sooted via partial oxidation to create the heat-transfer-aid particles to aid in the chemical reaction characteristics.

Sooting is exothermic and heats the gas through mixing. The heat-transfer-aid particles will increase heat transfer to the gas and increase yield. Further, enthalpy is added to increase temperature. Additionally, or alternatively very hot steam run through regenerator may be added to increase yield.

Note, soot may be impure carbon particles resulting from the incomplete combustion of a hydrocarbon. Soot may include the product of the gas-phase combustion process and extend to include the residual pyrolyzed fuel particles such as cenospheres, charred wood, petroleum coke, chars, and so on, that may become airborne during pyrolysis.

The control system keeps the reaction temperature in the chemical reactor high enough based on temperature sensor feedback to the control system to avoid the need for any catalyst to cause the chemical reaction occurring within the chemical reactor but allowing the temperature at or near the exit to be low enough for a hygiene agent supply line to inject hygiene agents to clean up the resultant product gas by removing undesirable compositions from the resultant product gas, promote additional reactions to improve yield, and any combination of these two, all while keeping the exit temperature of the chemical reactor greater than 900 degree C. to avoid tar formation in the products exiting the chemical reactor.

The control system may be configured to maintain the reaction temperature within the chemical reactor based upon feedback from a temperature sensor at at least 1200 degrees C. to eliminate the need for a catalyst for the chemical reactions as well as overdrive the endothermic reactions including the steam methane reforming and the steam ethane reforming, which are equilibrium limited; and thereby improve the equilibrium performance for the same amount of moles of reactant feedstock, to increase both yield of resultant gaseous products and throughput of that reactant feedstock.

The control system may control the multiple reactor tubes via splitting operation of them into two or more groups of tube subsets. The control system can do both for the integrated plant 1) control the feed to match the amount of energy, as well as control the radiant energy to match the amount of feed, now that system has the ability to control the amount of energy/heat sink out via increase or decrease amount of carrier gas and reactant flowing in a given set of reactor tubes as well as control heat into the reactor by 1) controlling an amount of fuel gas flowing in a given set of regenerative burners, 2) starting up additional sets of regenerative burners inside the thermal receiver, or any combination of these.

The control systems of the reactor and liquid fuel plant 720, such as a MTG synthesis plant, may have bi-directional communications between the chemical reactor and the liquid fuel plant, such as a methanol plant. For example, when a subset of tubes needs to be adjusted out for maintenance or due to a failure, then the integrated plant can continue to operate with increase biomass and entrainment gas flow through the chemical reactor to keep a steady production of syngas for conversion into a liquid fuel. Changing entrainment gas pressure in the reactor tubes can also be used to increase/decrease the heat sink effect of the biomass and gas passing through the tubes.

The integrated chemical plant 720 converts the supplied chemical reactants, such as particles of biomass, into gasoline in the integrated chemical plant as follows. The hydrogen and carbon monoxide products from the chemical reactor are converted in an on-site methanol synthesis plant to methanol, and the methanol from the methanol synthesis plant is converted to gasoline in a methanol-to-gas process. The on-site chemical synthesis reactor, such as a methanol synthesis plant, is geographically located on the same site as the chemical reactor and integrated to receive the hydrogen and carbon monoxide products in the form of syngas. The on-site chemical synthesis reactor has an input to receive the syngas, which contains the hydrogen and carbon monoxide products from the chemical reactor, and then is configured to use the syngas in a hydrocarbon synthesis process to create a liquid hydrocarbon fuel or other chemical. The methanol production from syngas production is decoupled from being directly tied the momentary rate of syngas production by storing excess syngas, supplying supplemental syngas, or idling methanol reactors.

Next, the various algorithms and processes for the control system may be described in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below. In general, the program modules may be implemented as software instructions, Logic blocks of electronic hardware, and a combination of both. The software portion may be stored on a machine-readable medium and written in any number of programming languages such as Java, C++, C, etc. The machine-readable medium may be a hard drive, external drive, DRAM, Tape Drives, memory sticks, etc. Therefore, the component parts, such as the transaction manager, etc. may be fabricated exclusively of hardware logic, hardware logic interacting with software, or solely software.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages. Also, an algorithm may be implemented with lines of code in software, configured logic gates in software, or a combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

In some of these endothermic reactions using steam as a reactant gas, such as Ethylene, the produced gas occurs from steam cracking. In this process, gaseous or light liquid hydrocarbons are heated to 900 to 1600° C., inducing numerous free radical reactions followed by immediate quench to stop these reactions. This process converts large hydrocarbons into smaller ones and introduces unsaturation. The produced gases from the chemical reaction, such as ethylene are separated from the resulting complex mixture by filters, repeated compression, and potentially distillation. Steam cracking occurs in the chemical reactor/furnace. Primary and secondary heat recovery from quench occurs in recovering heat from the gas products ash and heat aid particles leaving the chemical reactor. The energy recovered from this gas and particle mixture may be used to make high temperature and pressure (1200 psig) steam. This steam is in turn used to drive the turbines for compressing the cracked gas products or recycled into the chemical reactor.

Note, in steam cracking, the gaseous hydrocarbon feed is diluted with steam and briefly heated in a furnace generally without the presence of oxygen. The reaction temperature is very high, at or above 900° C., but the residence time of the reaction within the chemical reactor is only allowed to take place very briefly to improve yield. After the cracking temperature has been reached, the gas is quickly quenched to stop the reaction in the quench unit heat exchanger. Note, the products produced in the chemical reaction depend on the composition of the feed, the hydrocarbon to steam ratio, the cracking temperature maintained by the heat aid particles, and residence time in the chemical reactor.

Figure 10:
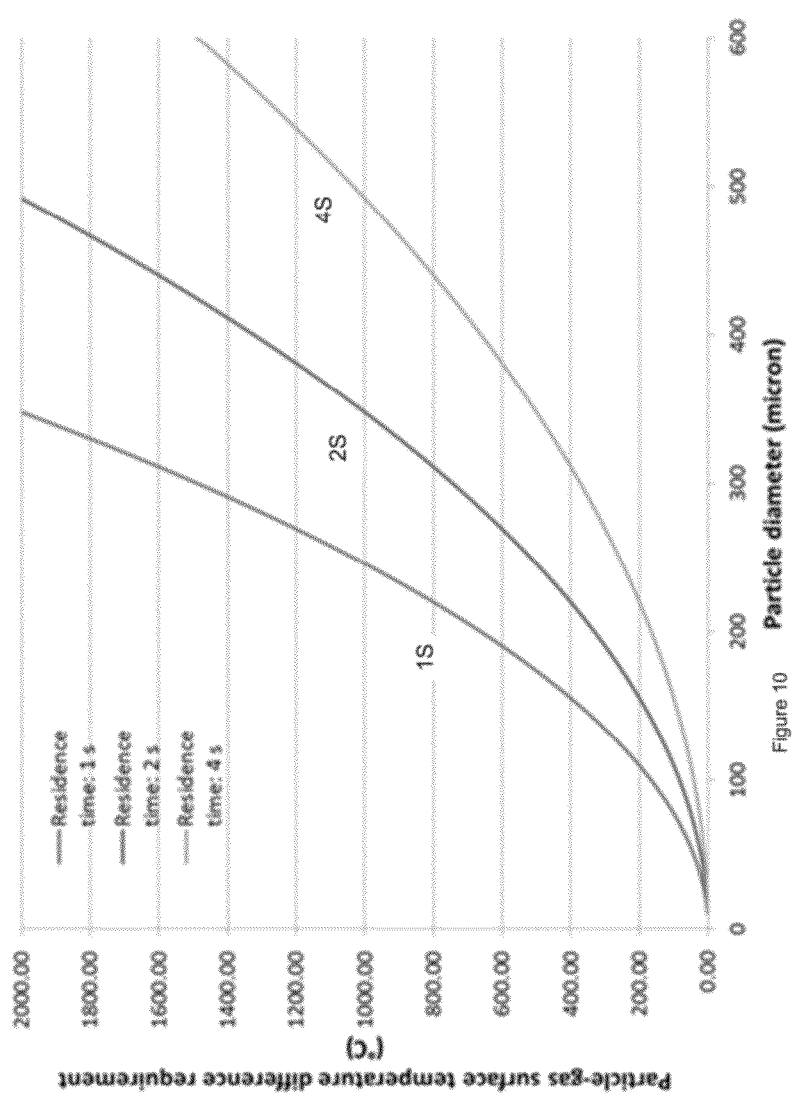
FIG. 10 illustrates a graph of an embodiment of the particle-gas surface temperature difference requirement.

FIG. 10 illustrates a graph of an embodiment of the particle-gas surface temperature difference requirement. As the size of the particle decreases, the residence time to hit that same temperature also decreases. Also, as the size of the particle increases, the greater the heat differential between the reactor surfaces and the reactant gas to achieve the same results.

A length and diameter dimensions of the gasification reaction zone of each of the reactor tubes is sized to give the very short residence time of 0.01 second to 5 second at the gasification temperatures of at least 900 degrees C. The reaction products have a temperature from the exit of the gasification zone that equals or exceeds 900 degrees C. The multiple reactor tubes in this chemical reactor design increase available reactor surface area for radiative exchange to the biomass particles, as well as inter-tube radiation exchange.

Figure 11:
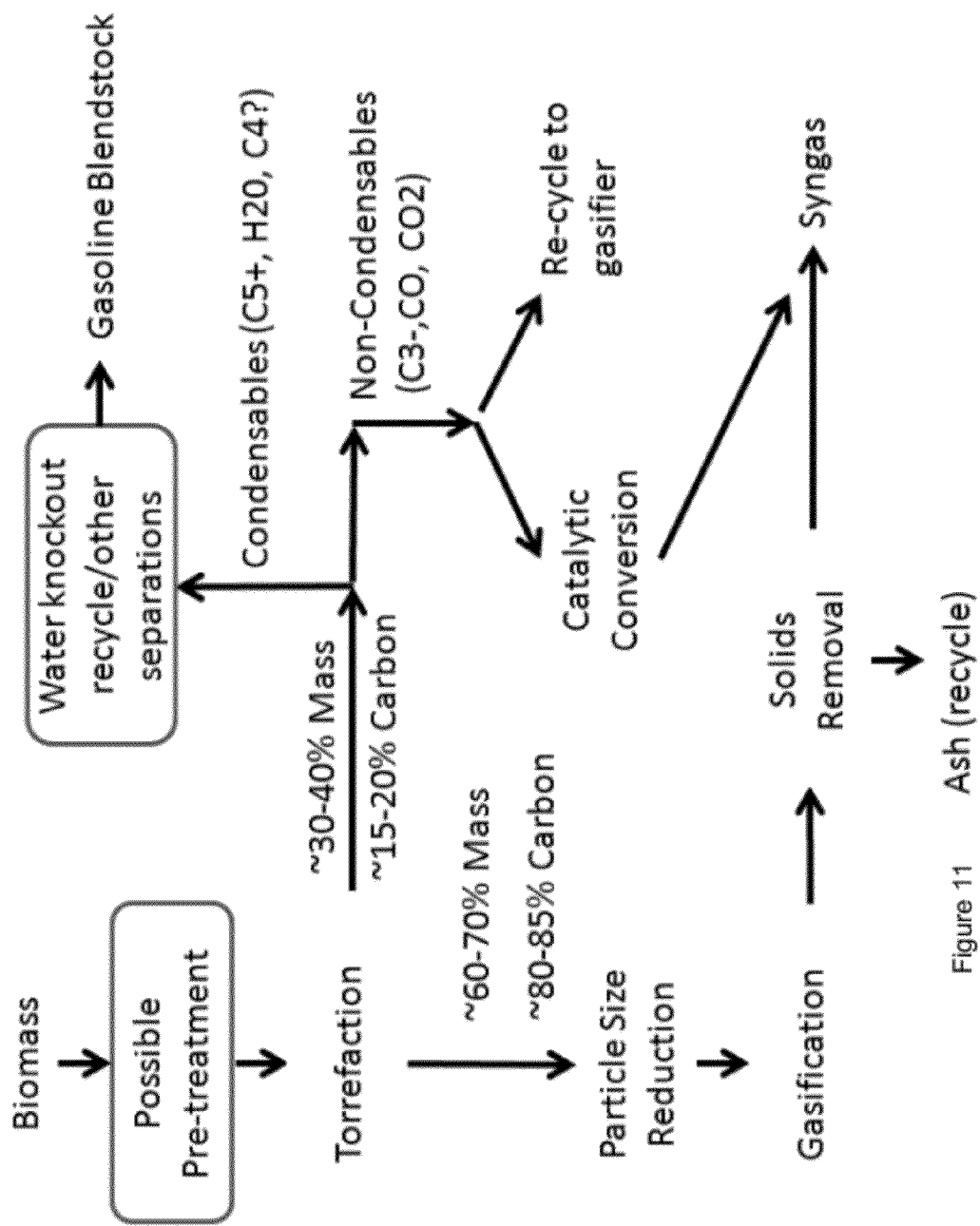
FIG. 11 illustrates a block diagram of an embodiment of another radiant heat driven chemical reactor that can utilize heat-transfer-aid particles.

FIG. 11 illustrates a block diagram of an embodiment of another radiant heat driven chemical reactor that can utilize heat-transfer-aid particles.

The source of the radiant heat maybe one or more of solar energy, gas-fired regenerative burners, nuclear power, and electric heaters, and any combination of these.

Figure 12:
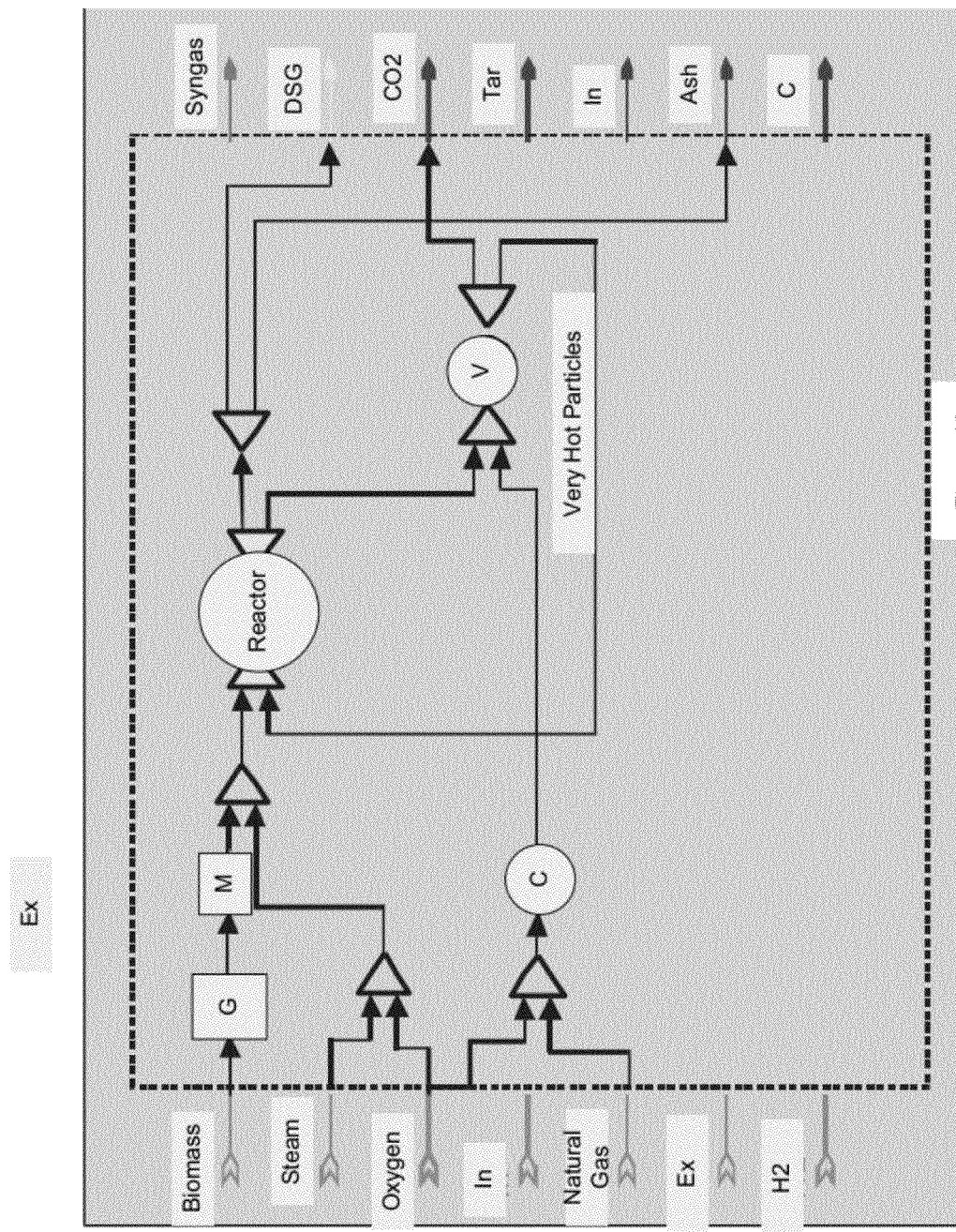
FIG. 12 illustrates a block diagram of an embodiment of another radiant heat driven chemical reactor that can utilize heat-transfer-aid particles.

FIG. 12 illustrates a block diagram of an embodiment of another radiant heat driven chemical reactor that can utilize heat-transfer-aid particles. Inert particles may be preheated to the gasification temperature (i.e. >1000 C) prior to addition into the gasifier and mixing with the biomass particles. An inert particle hopper contains the inert particles and connects to a combustion or partial oxidation unit to heat up the inert particles to at least 1100 degrees C. The biomass particles, high temperature steam, and preheated particles are injected into the biomass gasifier reactor. A small amount of oxygen may be added to maintain a reactor a temperature above 1000 degrees C. for the biomass gasification reaction of the biomass and steam. The hot inert particles will rapidly and simultaneously heat the biomass solids via radiation and the surrounding gas through conduction/convection. Additionally, a partial oxidation of the natural gas occurs at below a stoichiometric ratio to generate syngas when or if the biomass particle feed system is non-functioning. The biomass particles have an average particle diameter of 70 microns (with a range of 3 microns (individual cellulose fiber dimensions) to 140 microns). The Inert particles are sized to be at least twice the average particle diameter of the biomass particles, such as an average of 150 microns or bigger. Out of the biomass gasifier reactor particle recovery can occur for reuse. The inert particles are much bigger than the biomass particles and accordingly much bigger than the resulting ash after the biomass gasification decomposing those biomass particles. Thus, a dual cyclone system can be used to separate the ash from the inert particles. The first cyclone in line is sized to cause the larger inert particles to come out of the gas stream containing syngas components, ash and inert particles. The inert particle recover there can be fed back into the inert particle hopper to assist in heating the other particles and get heated back up to greater than 1100 degrees C. again. The inert particles do not have to carry any structural load rather merely stay together at high temperatures and emit radiation and conduct/convect heat to the surrounding gas and biomass particles.

Figure 13A:
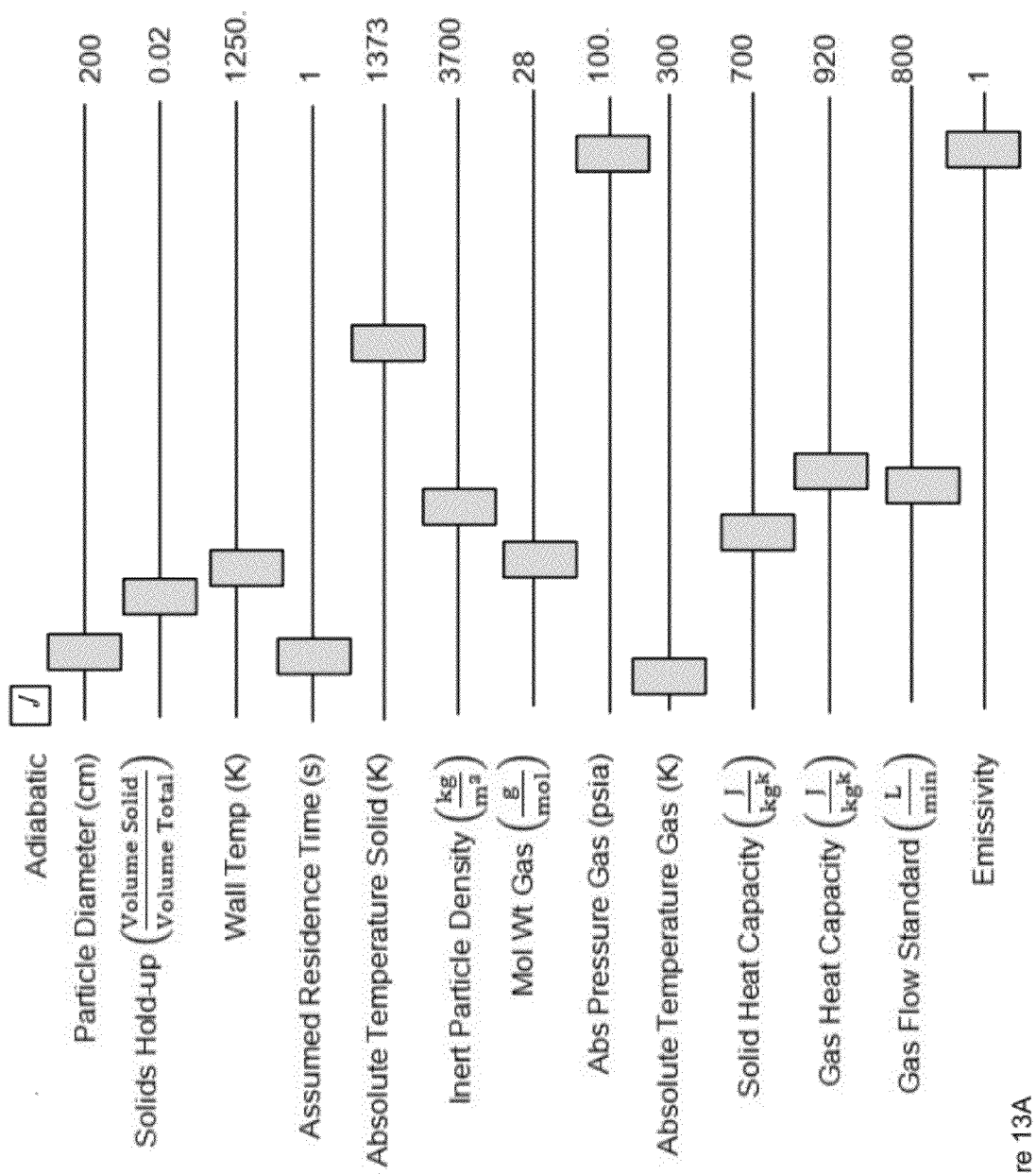
FIGS. 13A and 13B show a simple example model of gas heating with preheated inert particles.
Figure 13B:
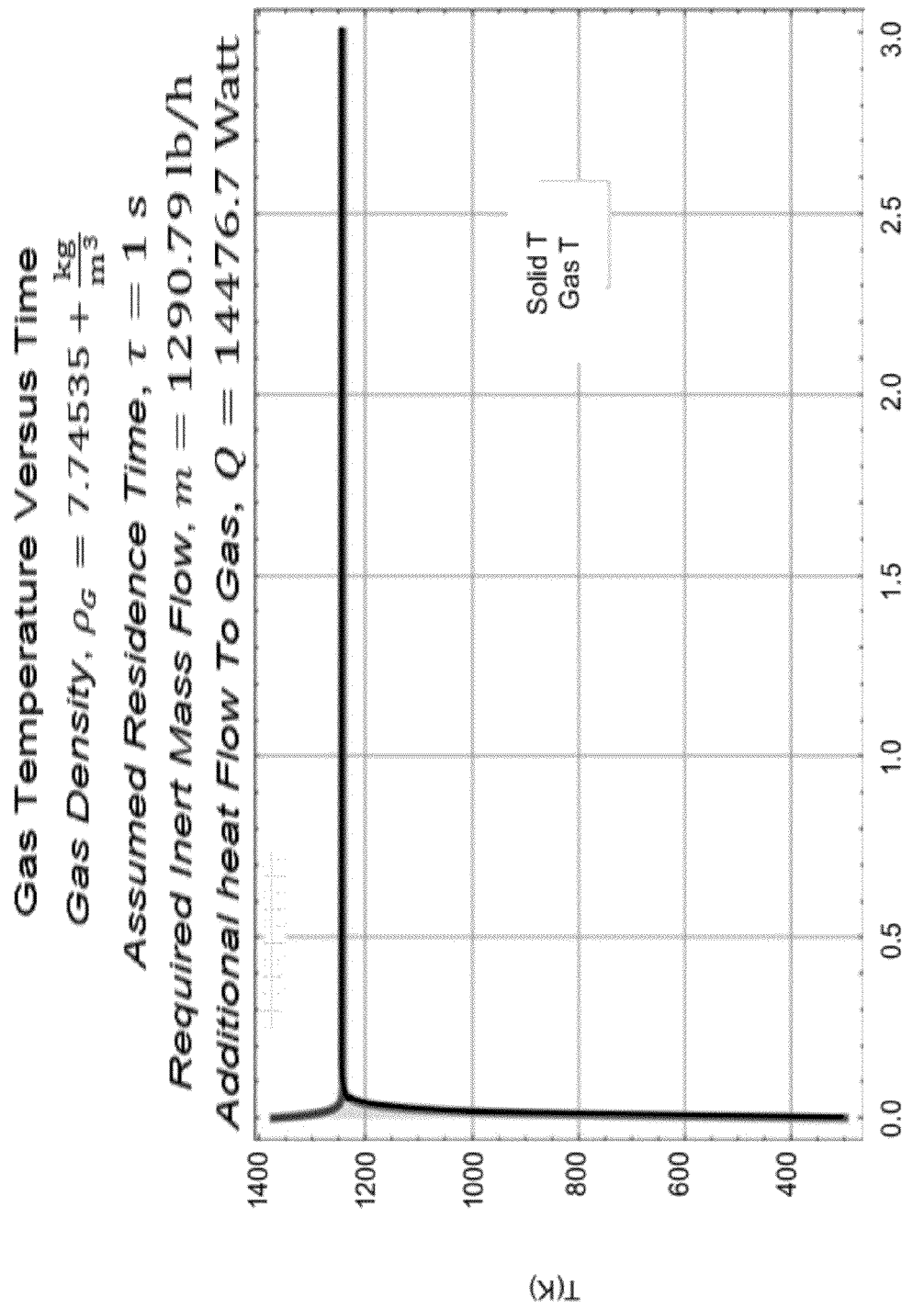

If the chemical reactor environment is kept at a partial oxidation level needed for biomass gasification, then mainly (i.e. a higher yield of) syngas components are generated from the decomposition of the biomass particles. Also, No large heat flux exist across a boundary wall of the reactor and thus minimizes stresses. The preheated inert particles cause rapid solids heatup and gas heatup in for example less than a tenth of a second to gasification temperature of the biomass when mixed with the hot inert particles. Entrainment gases of the biomass particles can include Nitrogen, steam, and methane. A partial oxidation environment also causes much less waste CO2. In a catalytic flywheel setup, much less waste CO2. Occurs, a smaller reactors design is possible, and no large heat flux across a boundary wall exist with the use of preheated inert particles. See FIGS. 13A and 13B showing a simple example model of gas heating with inert particles. The graphs show the example case where 200 micron particles are injected at 1373 degrees K into hot gas at a solids hold-up of 2%. The gas phase heats up to around 1000K in about 0.1 seconds.

Function Key for FIG. 12

| Symbol | Description |
| --- | --- |
| M | Solid/Fluid mover (e.g., a pump) |
| ⚙ | Physical transformation such as Grinding |
| ▷ | Combine streams |
| ◁ | Separate streams |
| ⊗ | Streams are physically separated by some barrier (e.g., heat exchanger) |

-continued

Function Key for FIG. 12

| Symbol | Description |
| --- | --- |
| V | A volume where some physical process takes place (e.g., gas-solid heat transfer) |
| R | A general reactor volume |
| C | A combustor |
| P | A partial oxidizer |
| S | A steam reformer |

In FIG. 12, the combustor unit (C) may be replaced with a partial oxidizer (P). In the catalytic embodiment, the partial oxidizer (P) may be combined with the volume (V) unit.

While some specific embodiments of the invention have been shown the invention is not to be limited to these embodiments. For example, the recuperated waste heat from various plant processes can be used to pre-heat combustion air, or can be used for other similar heating means. Regenerative gas burners or conventional burners can be used as a heat source for the furnace. The high flux reactor can be used for any type of endothermic reaction in any aspect of the chemical industry discussed herein. Biomass gasifier reactors other than a radiant heat chemical reactor may be used. The SMR may be/include a SHR (steam hydrocarbon reformer) that cracks short-chained hydrocarbons (<C20) including hydrocarbons (alkanes, alkenes, alkynes, aromatics, furans, phenols, carboxylic acids, ketones, aldehydes, ethers, etc, as well as oxygenates into syngas components. The invention is to be understood as not limited by the specific embodiments described herein, but only by scope of the appended claims.

The invention claimed is:

1. An apparatus, comprising:
a thermal receiver comprising a cavity;
a radiant heat chemical reactor comprising multiple reactor tubes located inside the cavity of the thermal receiver, wherein the chemical reactor is configured to contain a chemical reaction driven by radiant heat, wherein the chemical reaction is an endothermic reaction including one or more of biomass gasification and hydrocarbon reforming or cracking;
a source of heat-transfer-aid particles to be entrained with 1) biomass particles, 2) reactant gas, or 3) both;
one or more feed lines connected to the source of heat-transfer-aid particles configured to add the entrained heat-transfer-aid particles into the radiant heat chemical reactor, wherein an indirect radiation driven geometry of the radiant heat chemical reactor is configured to use radiation as a primary mode of heat transfer to the entrained heat-transfer-aid particles, wherein each reactor tube is configured to separate an exothermic heat source from the endothermic reaction occurring within the radiant heat chemical reactor;
wherein an inner wall of the cavity of the thermal receiver and the multiple reactor tubes are configured to act as radiation distributors by either absorbing radiation from the heat source and re-radiating it to the heat-transfer-aid particles, or reflecting the incident radiation to the heat-transfer-aid particles, where the radiation is absorbed by the heat-transfer-aid particles, and heat is then transferred by conduction and/or convection to the reactant gas at a temperature between 900° C. and 1600° C., where the heat-transfer-aid particles mixed with the reactant gas in the radiant heat chemical reactor sustain a reaction temperature and a heat transfer rate to stay within a pyrolysis regime;

a separator coupled downstream of the radiant heat chemical reactor to separate out the heat-transfer-aid particles from gas products from the chemical reaction, where the heat-transfer-aid particles are chemically inert to the chemical reaction occurring within the chemical reactor, are formed of a solid state of matter, and have an average effective diameter size of between 1,000,000 nanometers and 1000 nanometers to produce a sufficient heat surface-area to mass ratio of the heat-transfer-aid particles when dispersed with the reactant gas so as to stay within the pyrolysis regime during the chemical reaction;

a heat aid particle storage mechanism configured to accumulate the heat-transfer-aid particles and any ash remnants that exit the chemical reactor, wherein the separator is configured to separate the heat-transfer-aid particles and any ash remnants from the gas products of the chemical reaction into the heat aid particle storage mechanism, which is configured to extract heat from the accumulated heat-transfer-aid particles and the ash remnants so as to heat a working fluid that drives an electricity generation apparatus, a steam generation unit, or other apparatus used in doing heat based processes; and a control system programmed to control at least a heat-transfer-aid particle feed rate, a reactive gas feed rate, and an exit temperature of the radiant heat chemical reactor based on sensor measurements of these parameters conveyed back to the control system.

2. The apparatus of claim 1, further comprising:

one or more feed lines connected to a source of biomass particles configured to supply the biomass particles to be entrained with the heat-transfer-aid particles; where the heat-transfer-aid particles are mixed with the reactant gas and the biomass particles in the radiant heat chemical reactor and the heat-transfer-aid particles sustain the reaction temperature and the heat transfer rate to stay within the pyrolysis regime or a gasification regime while a mass of the biomass particles decreases during a biomass gasification reaction as the biomass particles travel through the radiant heat chemical reactor.

3. The apparatus of claim 2, where the heat-transfer-aid particles mixed with the biomass particles provide a base line minimum amount of particle surface area to absorb radiation energy from the inner wall of the cavity and the multiple reactor tubes throughout a duration of the chemical reaction within the chemical reactor; and thus, act as radiation heat transfer agents to the reactant gas and the biomass particles, which are consumed during the biomass gasification reaction, where an average effective diameter size of the heat-transfer-aid particles is between 1,000,000 nanometers and 10,000 nanometers, which is at least ten times greater than the wavelengths of absorbed radiation from the inner wall of the cavity and the multiple reactor tubes, and the heat-transfer-aid particles are also refractory at least up to a temperature of 1450 degrees C., and where the heat-transfer-aid particles added with the biomass particles in the radiant heat chemical reactor both radiate heat and conductively convey heat to the biomass particles and the reactant gas, which allows the feed biomass particles to be kept as small as possible, less than an average smallest dimension size between 10 micrometers (um) and 1000 um, so they almost immediately vaporize/flash upon entering the radiant heat chemical reactor, but the heat-transfer-aid particles continue conveying the radiated heat from the multiple reactor tubes and the inner wall of the cavity to the gas products at high heat transfer rates and at higher temperatures throughout the biomass gasification process within the chemical reactor.

4. The apparatus of claim 1, further comprising:

a boiler steam supply connected to the radiant heat chemical reactor, where the boiler steam supply provides steam to make up at least part of the reactant gas, and where the heated working fluid from the heat aid particle storage mechanism is used in the boiler steam supply to generate the steam;

a dispersion unit configured to evenly disperse the heat-transfer-aid particles in a gas phase with the reactant gas; and a quench unit immediately downstream of the radiant heat chemical reactor configured to rapidly cool the gas products including any ash remnants that exit the radiant heat chemical reactor;

wherein the radiant heat chemical reactor has a single stage in which the chemical reaction occurs within a single vessel of the chemical reactor.

5. The apparatus of claim 2, wherein the multiple reactor tubes are vertically orientated with the heat-transfer-aid particles, the biomass particles, and the reactant gas entering at or near a top of the reactor tubes, and the control system is programmed to maintain a temperature above 900° C. to cause a rapid biomass gasification reaction of dispersed falling biomass particulates and the reactant gas with the heat-transfer-aid particles present to produce a resultant stable ash formation, a complete amelioration of tar to less than 500 milligrams per normal cubic meter, and a production of hydrogen and carbon monoxide products.

6. The apparatus of claim 1, wherein the radiant heat chemical reactor is comprised of a multiplicity of discrete stages in which the chemical reaction occurs within the radiant heat chemical reactor, and the control system is programmed to maintain a temperature of the radiant heat chemical reactor to be above 1200 degrees C. in order to reduce methane concentrations to less than 1% and C2+ hydrocarbon concentrations to less than 500 mg/Nm^3 in the gas products exiting the radiant heat chemical reactor.

7. The apparatus of claim 1, wherein properties of the heat-transfer-aid particles include small effective diameters (<1,000,000 nm to 10 micron); the solid matter form; chemically inert to the chemical reaction occurring in the radiant heat chemical reactor; a high emissivity of eighty percent or greater; a low heat capacity (less than 1000 J/kg-K); a low density (less than 1500 kg/m^3, preferably less than 500 kg/m^3); a low thermal conductivity (less than 10 W/m-K); and are made of a refractory material that retains its strength at least up to a temperature of 1450° C., wherein one or more sets of gas fired heaters are configured to provide heat to the radiant heat chemical reactor controlled by the control system, where the control system keeps a reaction temperature in the radiant heat chemical reactor high enough, based on temperature sensor feedback to the control system, to avoid a need for any catalyst to cause the chemical reaction occurring within the radiant heat chemical reactor, but allowing the exit temperature to be low enough for a hygiene agent supply line to inject hygiene agents so as to clean up the resultant gas products by removing undesirable compositions, promoting additional reactions to improve yield, and any combination of these two, all while keeping the exit temperature of the chemical reactor greater than 900 degrees C. so as to avoid tar formation in the gas products exiting the chemical reactor.

8. The apparatus of claim 1, further comprising an oxygen supply line connected to the radiant heat chemical reactor configured to supply an oxygen based gas including O2, Air, and any combination of the two to the radiant heat chemical reactor, where the control system is configured to control a rate of oxygen addition based on feedback from an oxygen sensor connected to the radiant heat chemical reactor, where the heat-transfer-aid particles are generated in-situ within the radiant heat chemical reactor through sooting, and where CHx hydrocarbons are sooted via partial oxidation to create the heat-transfer-aid particles so as to aid in the chemical reaction's characteristics.

9. The apparatus of claim 2, wherein a feed system is configured to blend the biomass particles with the heat-transfer-aid particles prior to feeding and entraining them into the radiant heat chemical reactor, where materials of the heat-transfer-aid particles include silica, sand, Carbo HSP, other proppants, coal, petroleum coke, and recycled ash products from the biomass gasification reaction exiting the radiant heat chemical reactor and any combination of these materials, to improve the heat transfer rate throughout the biomass gasification reaction, and where the recycled ash products from the separator is blended with the biomass particles in the feed system to generate additional heat from both combustion and as a radiation absorption particle in order to fully utilize the remaining carbon atoms in the recycled ash products.

10. The apparatus of claim 1, where the control system is programmed to maintain a reaction temperature within the radiant heat chemical reactor based upon feedback from a temperature sensor at at least 1200 degrees C. so as to eliminate a need for a catalyst for the chemical reactions, as well as to drive the endothermic reactions including steam methane reforming and steam ethane reforming, which are equilibrium limited, and thereby improve an equilibrium performance for a same amount of moles of reactant feedstock, to increase both yield of the resultant gas products and throughput of the reactant feedstock, and where the heat-transfer-aid particles are mechanically metered and that parameter is passed to the control system and the heat-transfer-aid particles are then entrained into the reactant gas flow which is then fed downward through the radiant heat chemical reactor; and the separator coupled to the radiant heat chemical reactor mechanically separates the heat-transfer-aid particles from the gas product stream and recovers the heat-transfer-aid particles for reuse as feedstock in a feed system to the radiant heat chemical reactor, and the radiant heat chemical reactor comprises the temperature sensors to measure an inlet gas temperature, a wall temperature, an exit temperature, and any combination of these to provide the feedback to the control system.

* * * * *